United States Patent [19]
Osugi

[11] Patent Number: 6,088,139
[45] Date of Patent: Jul. 11, 2000

[54] METHOD AND AN APPARATUS FOR RECORDING AND REPRODUCING USING A HOLOGRAM, AN APPARATUS FOR IRRADIATING LIGHT FOR REPRODUCTION TO A HOLOGRAM, A HOLOGRAM DEVICE AND A MANUFACTURING METHOD OF THE SAME

[75] Inventor: Yukihisa Osugi, Nagoya, Japan

[73] Assignee: NGK Insulators, Ltd., Japan

[21] Appl. No.: 08/701,135

[22] Filed: Aug. 21, 1996

[30] Foreign Application Priority Data

Aug. 31, 1995 [JP] Japan .................................... 7-245105
Sep. 4, 1995 [JP] Japan .................................... 7-226542
Dec. 6, 1995 [JP] Japan .................................... 7-344391

[51] Int. Cl.[7] .............................. G03H 1/26; G03H 1/22; G03H 1/02
[52] U.S. Cl. .................................. 359/22; 359/32; 359/7; 359/3
[58] Field of Search ..................... 359/7, 10, 28, 359/32, 24, 22; 365/124, 125

[56] References Cited

U.S. PATENT DOCUMENTS

| | | | |
|---|---|---|---|
| 4,138,189 | 2/1979 | Huignard et al. | 359/7 |
| 4,655,542 | 4/1987 | Dube | 359/7 |
| 4,927,220 | 5/1990 | Hesselink et al. | 359/7 |
| 4,968,108 | 11/1990 | Ikeda et al. | 359/32 |
| 5,132,100 | 7/1992 | Abe | 423/593 |
| 5,361,149 | 11/1994 | Hasegawa et al. | 359/9 |
| 5,377,287 | 12/1994 | Lee et al. | 359/741 |
| 5,539,542 | 7/1996 | Picoli et al. | 359/7 |

FOREIGN PATENT DOCUMENTS

| | | |
|---|---|---|
| 57-105765 | 7/1982 | Japan . |
| 64-18993 | 1/1989 | Japan . |
| 1-234399 | 9/1989 | Japan . |
| 7-505964 | 6/1995 | Japan . |

OTHER PUBLICATIONS

Study Report on Laser Science, pp. 1–9 (1990), "Holographic Recording Property of BSO Single Crystal".

Journal of Japan Crystal Growth Society, vol. 17, No. 2, (1990), pp. 60–66.

"Optical Qualities Involved in Growth Facet of Bi12Geo20 Single Crystals," Technical Report of IEIEC vol. 87, No. 373, pp. 21–27.

Koichi Nishizawa, "Optical Mounting Technology of Microoptics," The Journal of Japan Institute for Interconnecting and Packaging Electronic Circuits, vol. 10, No. 5, pp. 315–319, 1995.

*Primary Examiner*—Audrey Chang
*Attorney, Agent, or Firm*—Parkhurst & Wendel, L.L.P.

[57] ABSTRACT

Object rays and reference rays are projected to record interference fringes on a volume hologram comprising a material exhibiting a photoinducing refractive effect, and a reconstructed image is obtained by illuminating the volume hologram with reconstruction rays. When the wavelength $\lambda_1$ of the object rays is longer than the wavelength $\lambda_2$ of the reconstruction rays, the reconstruction is conducted by illuminating the volume hologram with a convergent spherical wave and when the wavelength $\lambda_1$ of the object rays is shorter than the wavelength $\lambda_2$ of the reconstruction rays, the reconstruction is conducted by illuminating the volume hologram with a diffused spherical wave.

9 Claims, 25 Drawing Sheets

FIG._2a
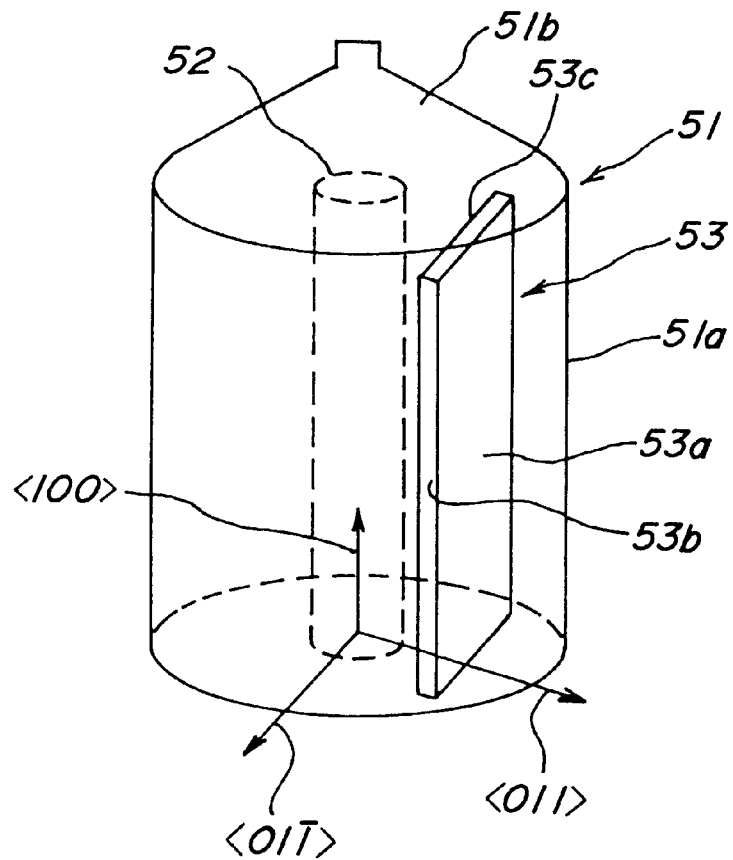
FIG._2b
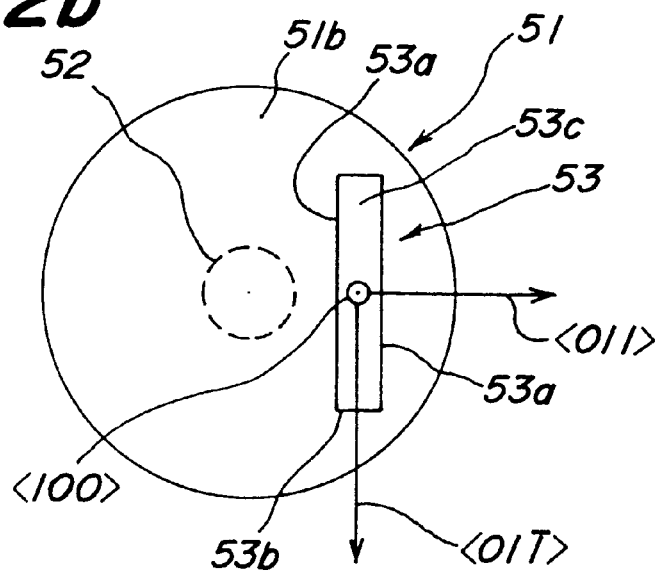

FIG._4a
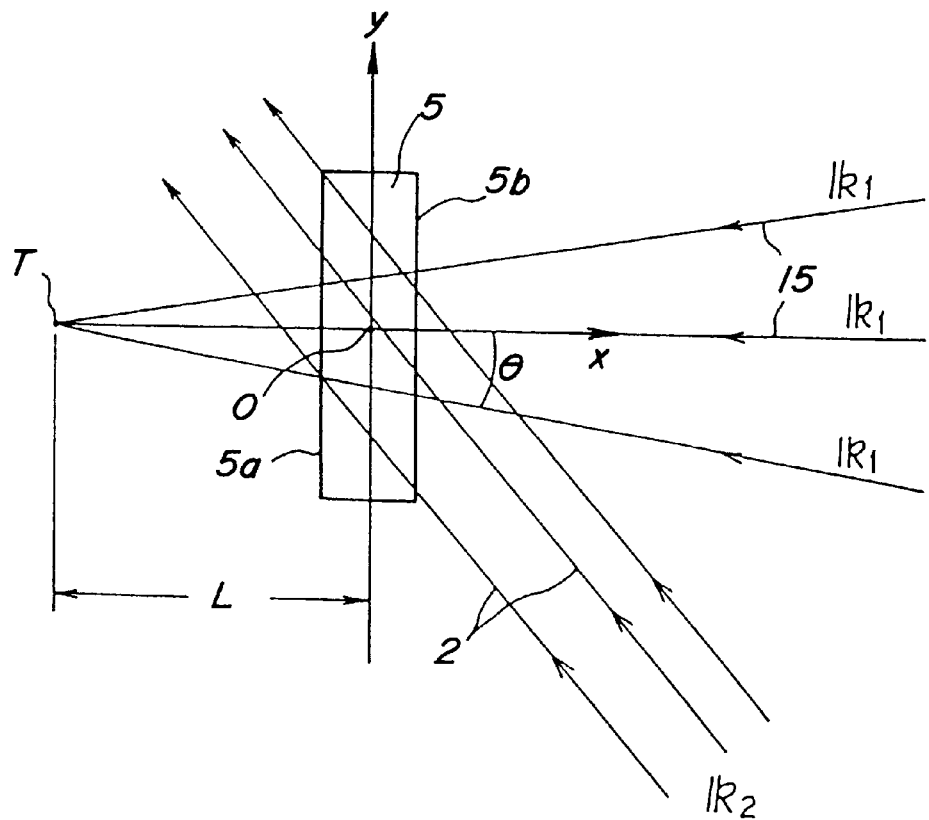
FIG._4b
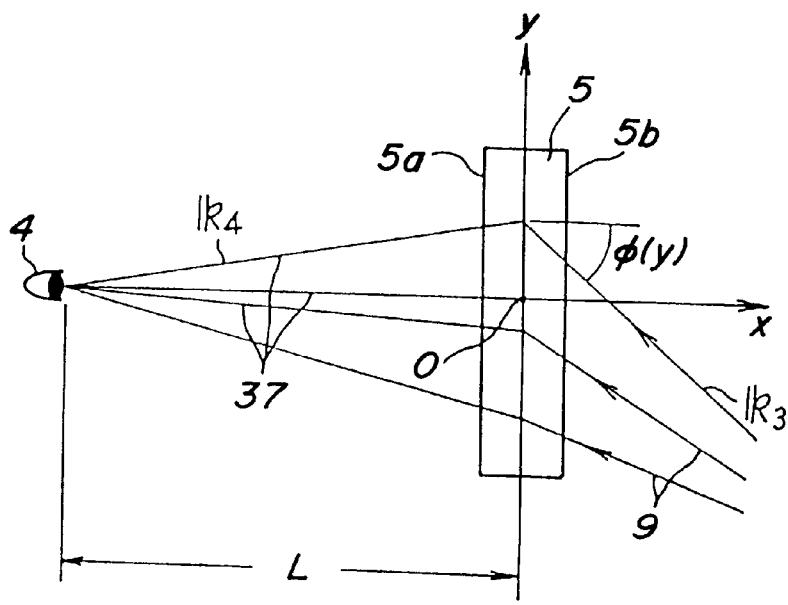

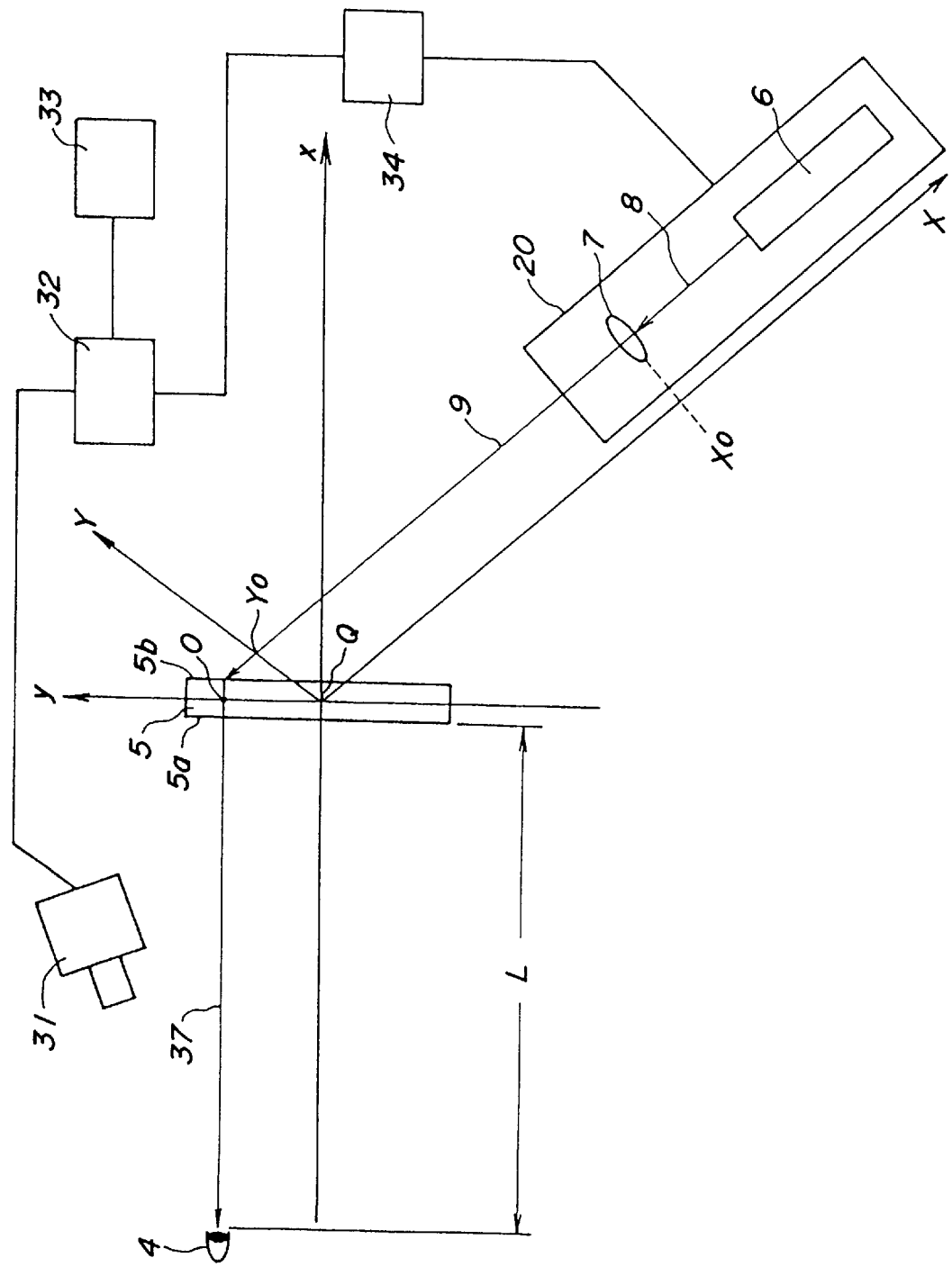

FIG_8a
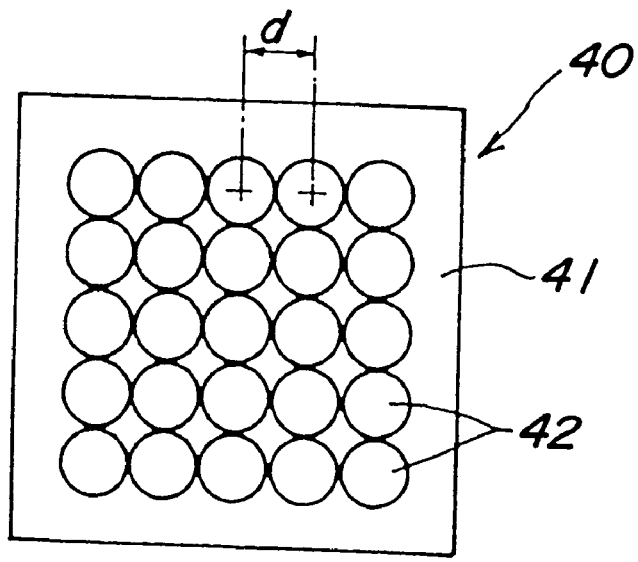
FIG_8b
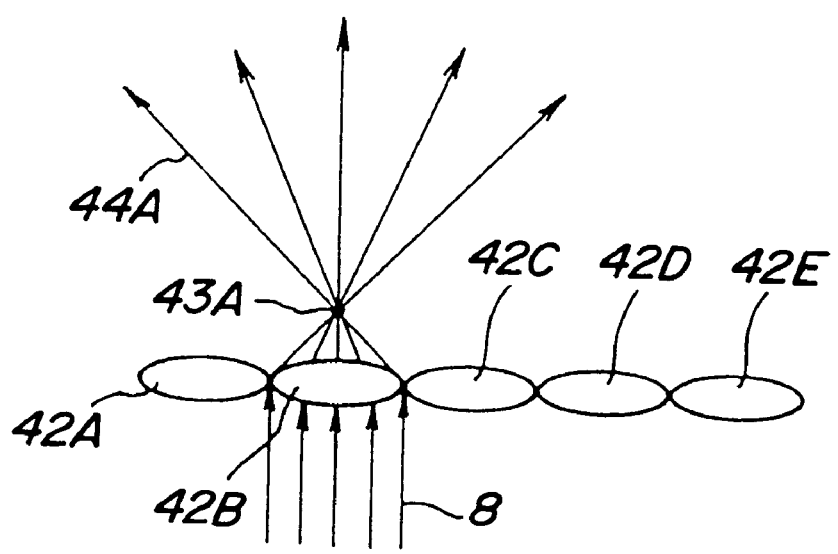

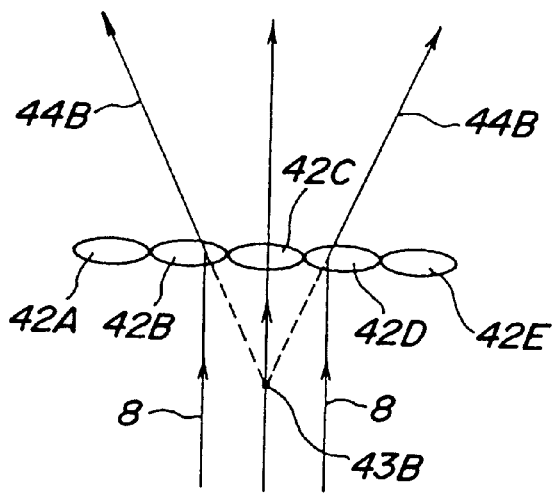
FIG_9a
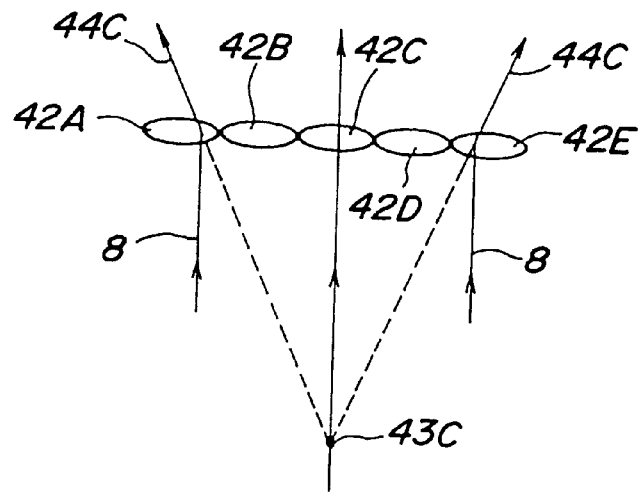
FIG_9b
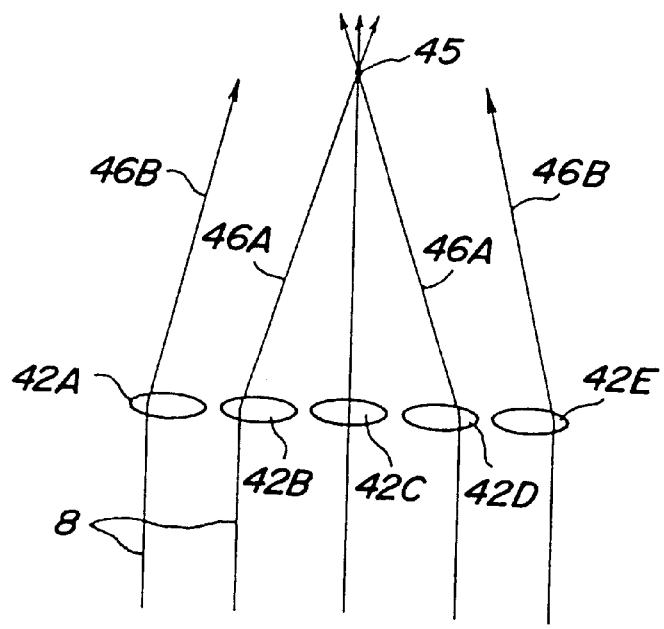
FIG_9c

FIG_11a
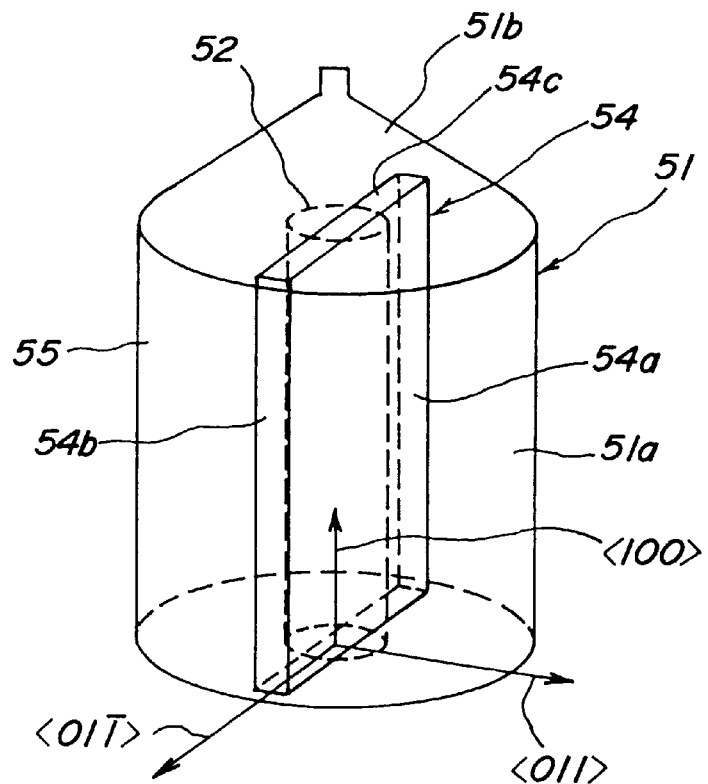
FIG_11b
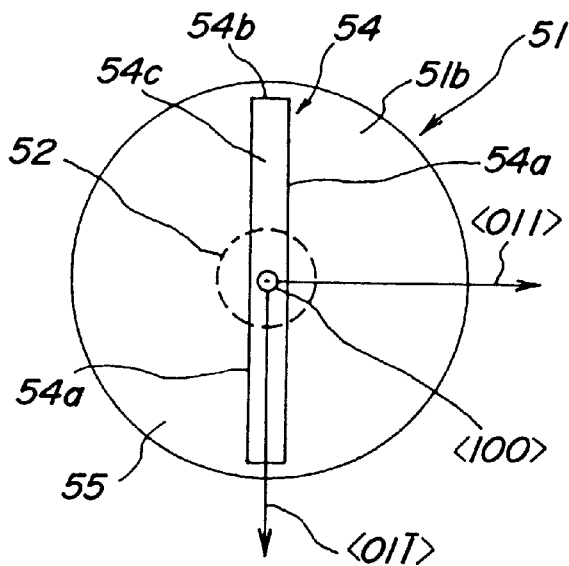
FIG_11c
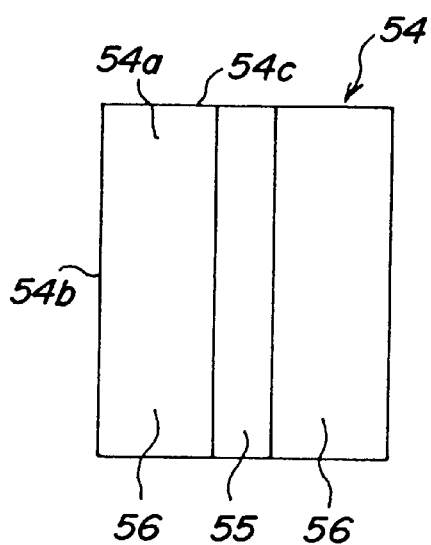

FIG_12a
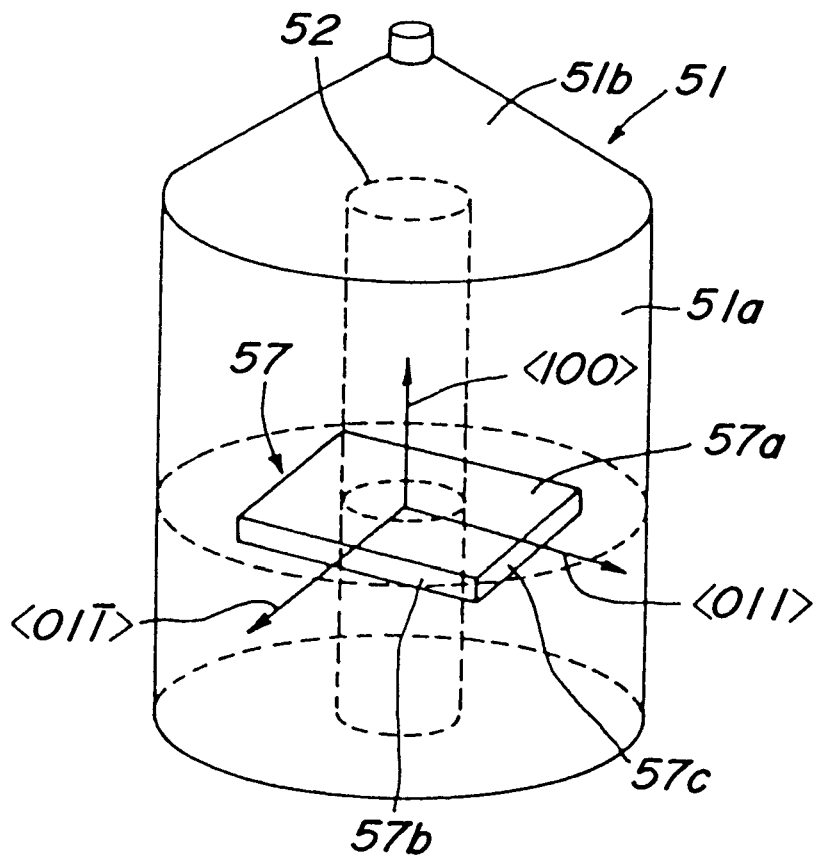
FIG_12b
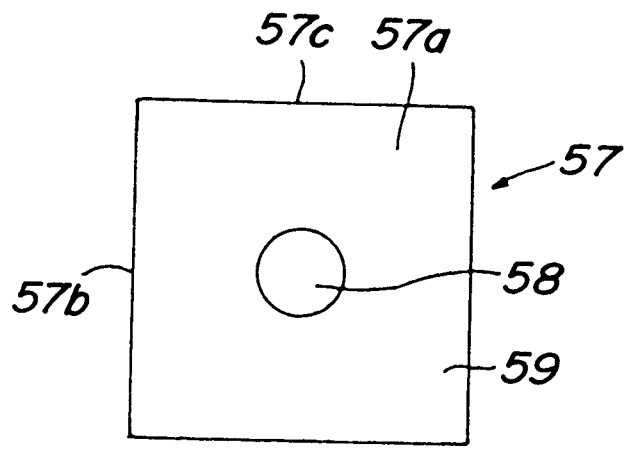

FIG_15

FIG_16

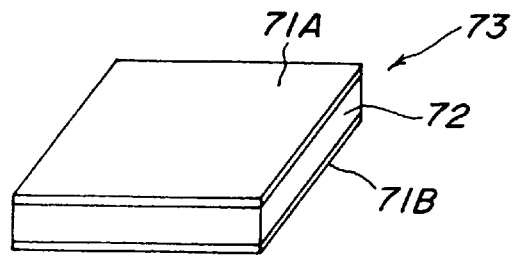
FIG._19a
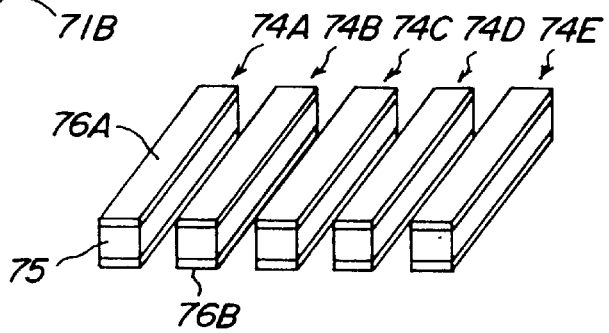
FIG._19b
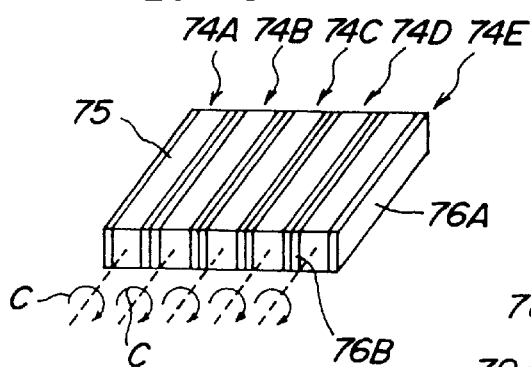
FIG._19c
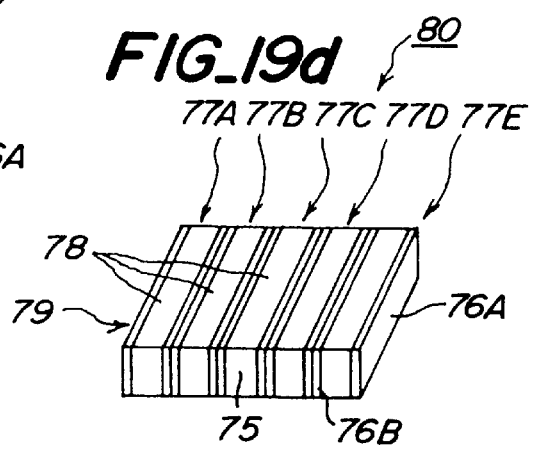
FIG._19d
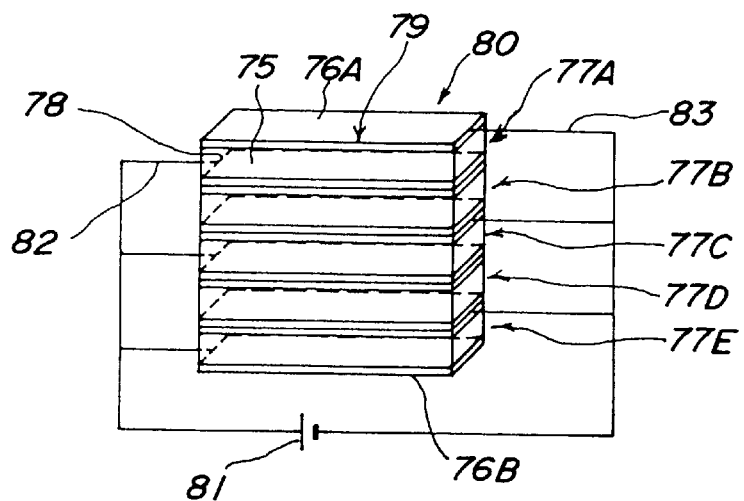
FIG._20

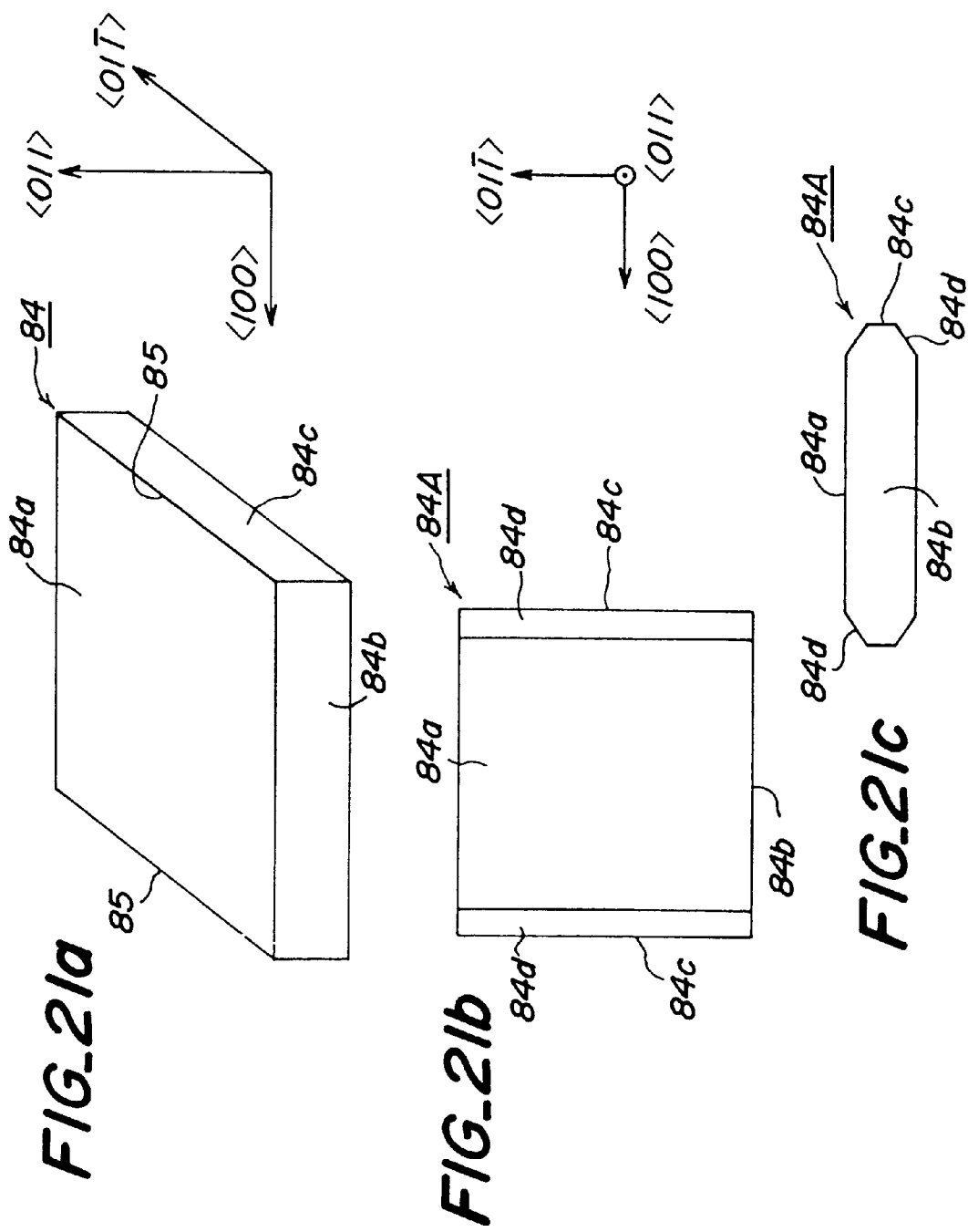

FIG._22a
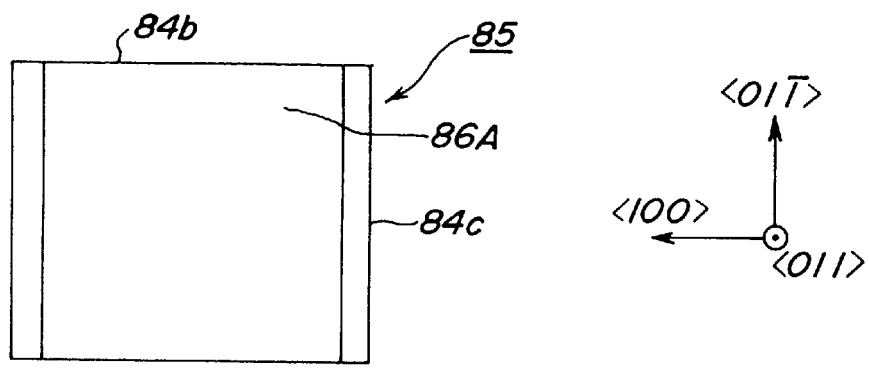
FIG._22b
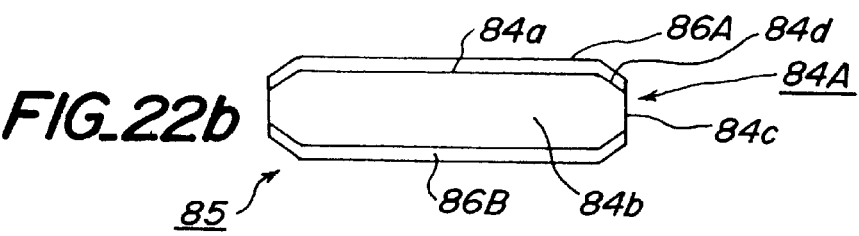
FIG._22c
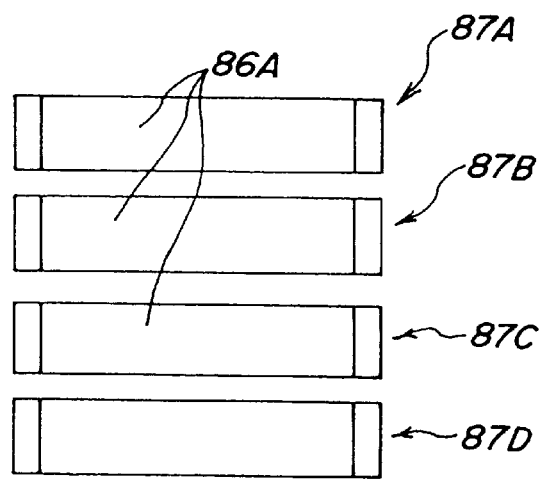

FIG._23a
FIG._23b
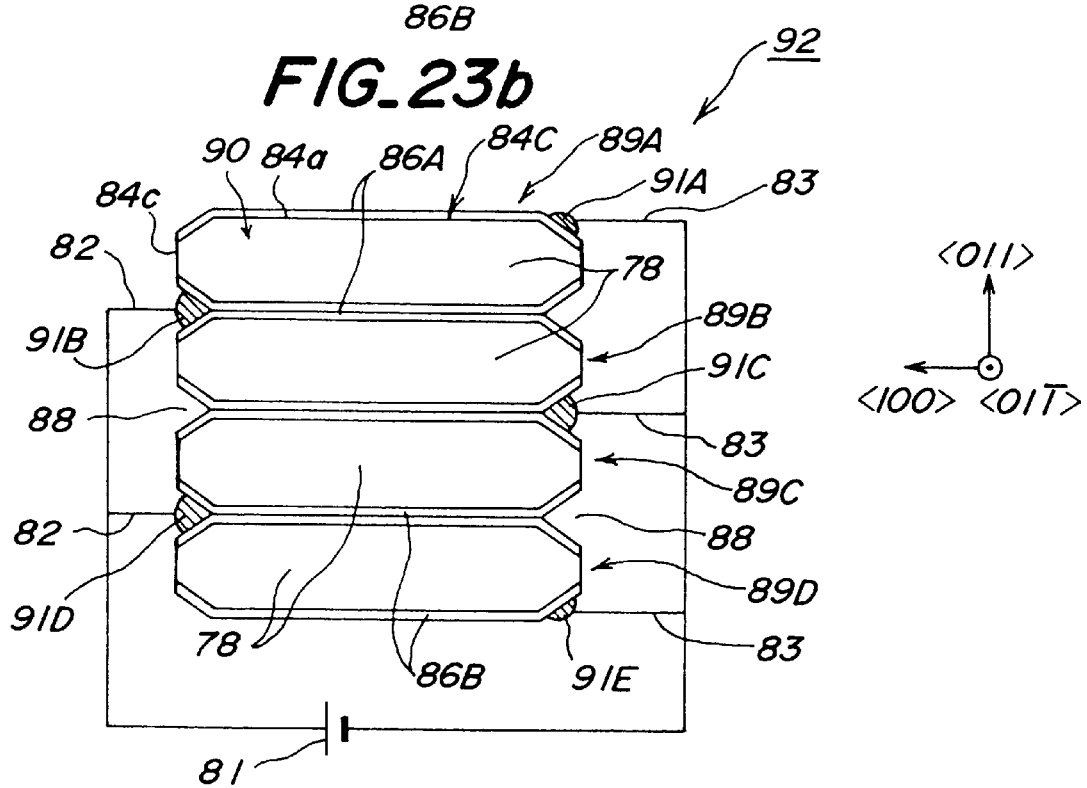

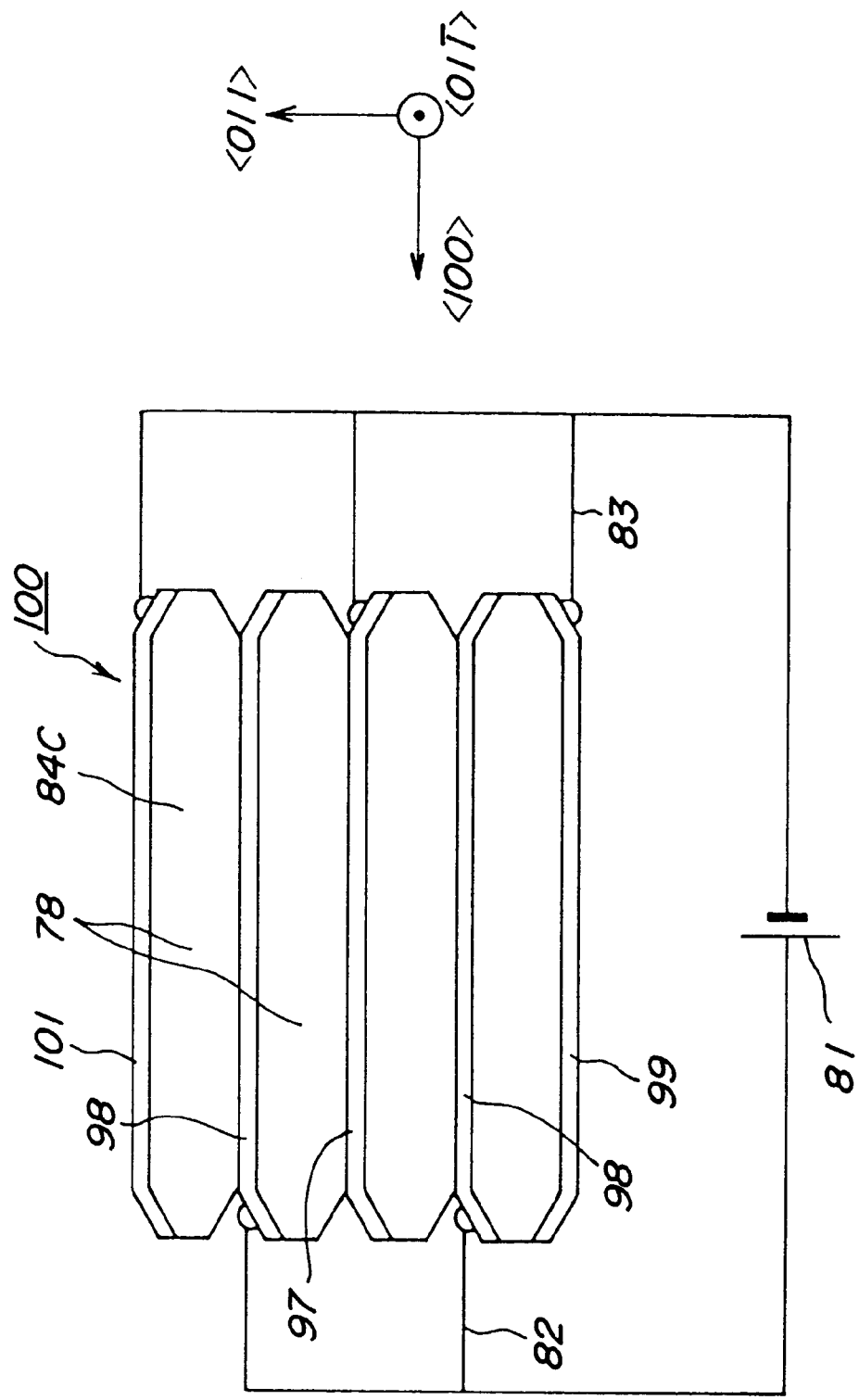

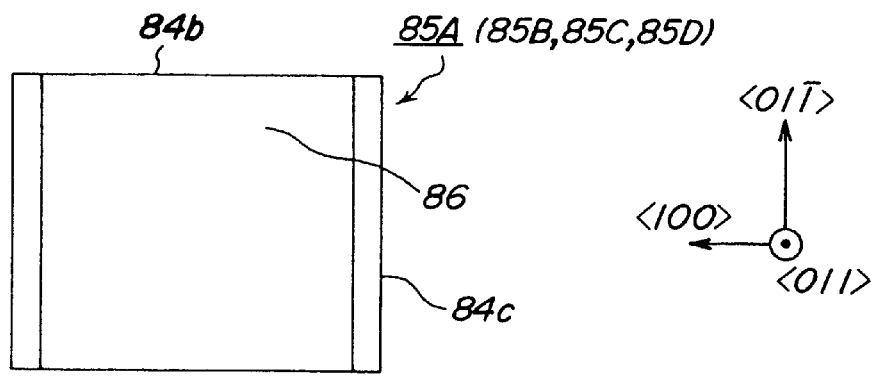
FIG_26a
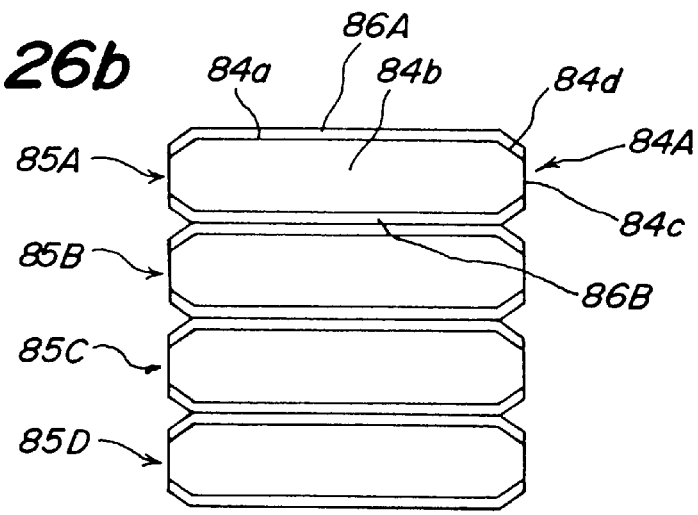
FIG_26b
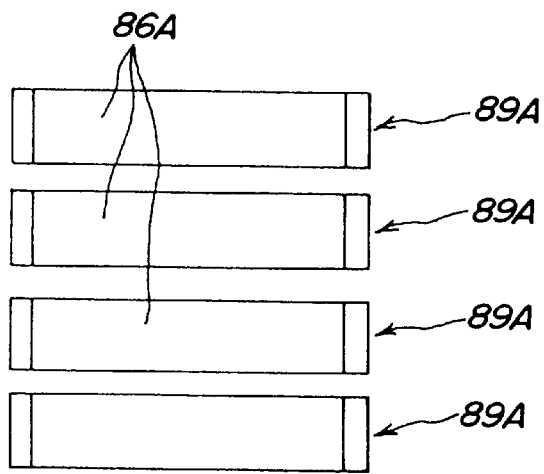
FIG_26c

FIG_27
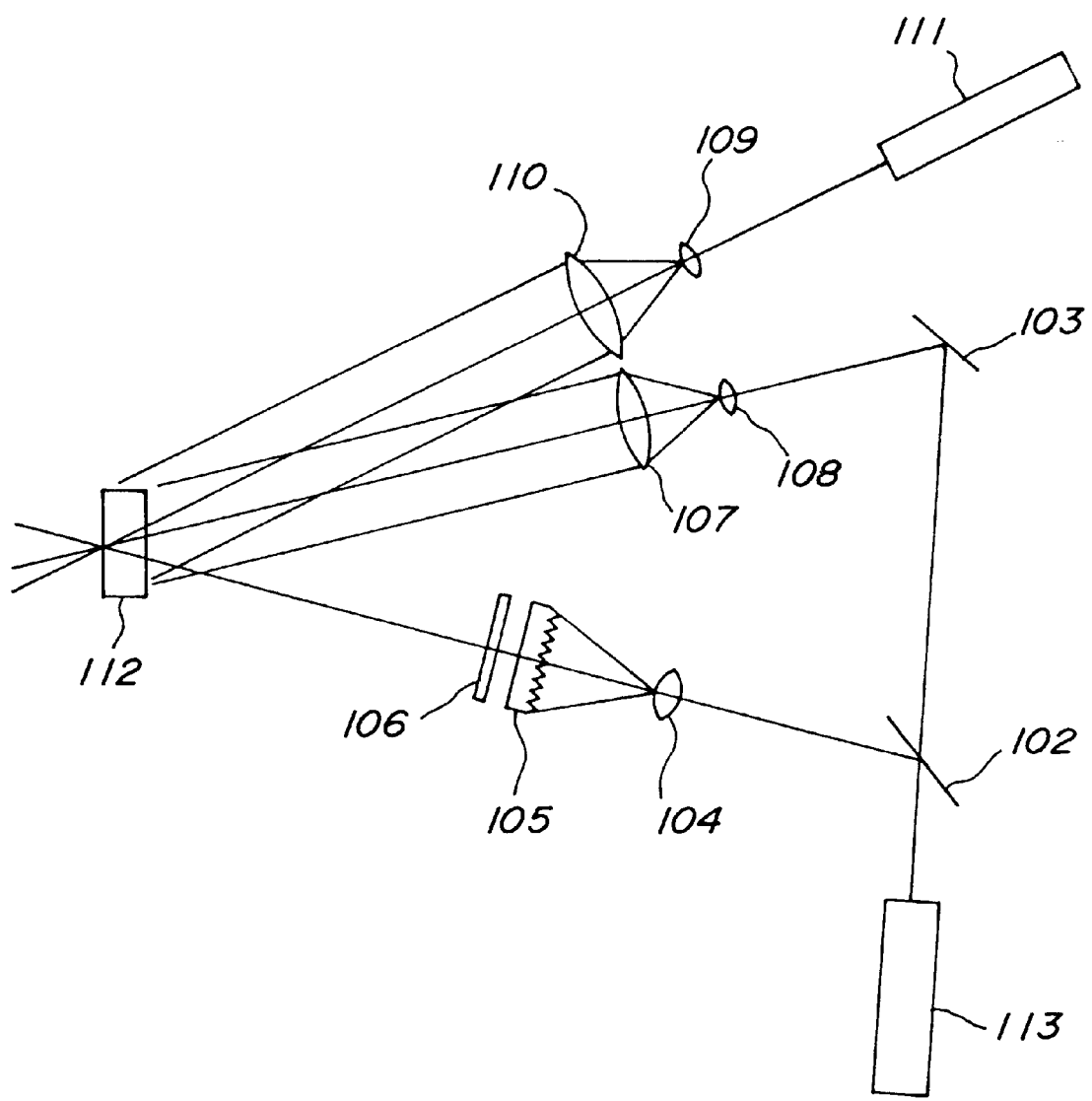

METHOD AND AN APPARATUS FOR RECORDING AND REPRODUCING USING A HOLOGRAM, AN APPARATUS FOR IRRADIATING LIGHT FOR REPRODUCTION TO A HOLOGRAM, A HOLOGRAM DEVICE AND A MANUFACTURING METHOD OF THE SAME

BACKGROUND OF THE INVENTION

1. Field of the Invention

This invention relates to a hologram recording and reconstructing method, wherein a $Bi_{12}SiO_{20}$ single crystal or the like are used as a material for recording of a volume hologram, an apparatus therefor, an apparatus for projecting reconstruction rays, and a hologram element and a manufacturing method thereof.

2. Description of the Related Art

The holography has been applied, as a technique for reconstructing a perfect wavefront, and in measurement of interference, optical information processing and optical elements. In order to conduct a hologram recording or holographic interference method, nowadays, silver salt photosensitive materials have generally been used, which are excellent in sensitivity and resolving power. However, when the silver salt photosensitive materials are used, naturally a process of development treatment is required. Therefore, photorefractive crystals (crystals showing a photoinducing refractive effect) beginning with $Bi_{12}SiO_{20}$ single crystals have been extensively investigated as a real-time hologram (RH) element (see, e.g. Study Report on Laser Science, Mar. pp. 1–9, (1990), "Holographic Recording Property of BSO Single Crystal"). These materials, since they can record a hologram and reconstruct as it stands only by impressing voltage, have been attracting attention particularly as a material for real-time hologram elements. In the above literature, object rays and reference rays are projected on a (110)-orientated crystal face of the $Bi_{12}SiO_{20}$ single crystal, an electrode is attached to both terminal surfaces of the (110) face and an electric field of several kV/cm is impressed in the direction perpendicular to interference fringes.

On the other hand, as to the dimension of the hologram, though it is restricted according to the use object in various uses, such as measurement of interference, optical information processing and optical elements, large-size elements have not necessarily been required. However, in the use for three-dimensional display that has been long-expected to be put to practical use, it is absolutely necessary to increase the size of the hologram to at least a certain extent. Because, in the use for the three-dimensional display, it is necessary to utilize binocular parallax for observers' stereoscopical recognition and, therefore, the size of the hologram must be larger than the distance of both eyes (about 50 mm).

However, the upper limit of the size of real-time hologram elements, since it is restricted physically by the shape and size of the BSO single crystal that is a recording member for recording interference fringes, has been substantially at most ten and several mm×ten and several mm. Due to this restriction of the dimension, the use of the real-time hologram elements has so far been limited only to the measurement of interference and the optical information processing. However, the real-time hologram is a technique which, in particular, has been eagerly desired to be put to practical use in future, and its application as an output apparatus of a three-dimensional image display system, substantially, such as a three-dimensional CAD system or the like, has been waited for. Therefore, large-size real-time hologram elements have been strongly expected.

The $Bi_{12}SiO_{20}$ single crystals, since they have a low heat conductivity as compared with general oxide single crystals, are difficult to give off latent heat evolving following crystallization. Therefore, during growing of the crystals, strains or cracks associated with thermal distribution within the crystals are readily formed and therefore the large-sizing has been deemed to be difficult. However, the researchers belonging to this applicants' company, disclosed a process suited for pulling up single crystals by means of a pull-up method (Czochralski technique) (see, Journal of Japan Crystal Growth Society, Vol. 17, No. 2 (1990), pp. 60–66; Japanese Patent Kokai Nos. 64-18993 and 1-234399).

DISCLOSURE OF THE INVENTION

The present inventors conducted investigations to solve the above problems and as disclosed in the specification of Japanese Patent Application No. 7-245105, fabricated a large-size BSO single crystal boule, cut out a large-size hologram, for example, at least 60 mm wide, from this single crystal boule, and succeeded in conducting hologram recording and reconstruction. Furthermore, in the specification of Japanese Patent Application No. 7-245105, we fabricated a hologram having a large area by conjoining a plurality of BSO single crystal disks together and succeeded in recording a hologram thereon and reconstruction thereof.

However, in the course of further proceeding with investigations of real-time holograms, it has been found that the following problems have been further posed. Namely, most of the holograms now put to practical use are made of a silver salt photosensitive material and about 5 $\mu$m–17 $\mu$m thick, and so extremely thin. In contrast therewith, photorefractive single crystals, such as BSO, $Bi_{12}SO_{20}$ single crystals, $Bi_{12}GeO_{20}$ single crystals or the like, are the so-called "volume holograms" (volume holograms). Volume holograms are at least 0.05 mm thick, usually 0.1 mm/10 mm. In such a volume hologram, the angle selectivity of the angle of incidence of the reconstruction rays is strict. Namely, the width of the variation of the diffraction efficiency at an angle of incident of the reconstruction rays is very narrow i.e. several mrads, that is, the diffraction takes place only in the direction satisfying the so-called Bragg's conditions.

For example, as shown schematically in FIG. 1, it is assumed that interference fringes corresponding to a reconstructed image 1 are recorded in a hologram 5 having a dimension or size such that binocular parallax can be utilized. When the principal surface 5b of the hologram 5 is illuminated with reconstruction rays 49, the reconstruction rays interfere with the interference fringes in the hologram 5 and emergent rays 3 exit from the principal surface 5a side at an exit angle satisfying the Bragg's conditions. In order to observe the reconstructed image 1, it is necessary to position a pupil 4 with a predetermined distance from the principal surface 5a.

However, in order to make the depth of the reconstructed image 1 observable in the real-time hologram apparatus, it is necessary to utilize the binocular parallax, as mentioned above, by using a large-size hologram 5. Besides, for substantiating real-time hologram apparatuses, it is necessary to use volume holograms. However, the rays practically entering the pupil 4 among the emergent rays 3 obtained by the volume hologram 5 are only 3A, and the emergent rays 3 passing above and below the pupil do not enter the pupil. In consequence, it has been found that even if holograms having a large area are utilized, a portion visible from the pupil in the reconstructed image 1 is only 1a, and the portion 1b is totally invisible. Therefore, even if the reconstruction is conducted by using holograms having a large area, merely an extremely small reconstructed image can be observed, and thus only a part of the reconstructed image can be observed.

The task of the present invention is, in apparatuses for observing reconstructed images of hologram, utilizing a volume hologram, such as real-time hologram apparatuses or the like, to extend a practically observable area of the reconstructed image that is constructed by diffracted rays from the volume hologram, preferably, to make it possible to observe an entire reconstructed image.

Besides, the inventors have engaged in large-sizing of $Bi_{12}SiO_{20}$ single crystals by applying the processes disclosed in "Journal of Japan Crystal Growth Society, Vol. 17, No. 2 (1990), pp. 60–66" and Japanese Patent Kokai Nos. 64-18993 and 1-234399, and have succeeded in growing large-size single crystalline bodies having a diameter of 80 mm and a length of 100 mm. However, these single crystalline bodies, since they have posed the following problem, have been difficult to cut out large-size recording members therefrom. This problem will be explained making reference to FIGS. 2(a) and 2(b).

In general, when single crystalline bodies are grown, the feasibility of the growing depends on the direction of growth. In the case of $Bi_{12}SiO_{20}$ single crystals, it has been known that the direction of the <100> axis or <111> axis is a growable direction. Particularly, according to a process as described above, with respect to the direction of the <100> axis, growth of a large-size single crystalline body has been successfully achieved. FIG. 2(a) is a slant view showing this single crystalline body 51, and FIG. 2(b) is a plan view showing this single crystalline body 51. The main body 51a of the single crystalline body 51 has a cylindrical shape and a summit portion 51b of substantially a conical shape is formed on the top of the main body 51a. The single crystalline body 1 has been pulled up in the direction of the <100> axis.

It has been known that the $Bi_{12}SiO_{20}$ single crystals are crystalline bodies showing a photorefractive effect upon impression of voltage and, in this instance, the diffraction efficiency is most increased when an external electric field is impressed in the direction parallel with the <01$\bar{1}$> axis on wafer having (011)-orientated principal surfaces. When the wafer having (011)-oriented principal surfaces is cut out from the single crystalline body 1 that has been pulled up in the direction of the <100> axis, cutting-out of a recording member 53 by cutting the single crystalline body 51 in the vertical direction, as shown in FIGS. 2(a) and 2(b), is the way for obtaining recording members having a largest area. A couple of principal surfaces 53a of this recording member 53 are (011) faces, the longer side surfaces 53b are (011) faces, and the shorter side surfaces 53b are (100) faces.

However, the $Bi_{12}SiO_{20}$ single crystals are extremely different in growth rate in every direction of crystalline orientations, so that a domain 52 which is called a core having a high concentration of impurities is formed in the central portion of the single crystalline body 51. This core portion 52 has nearly a cylindrical shape extending in the pull-up direction of the single crystalline body 51. The diameter of the core portion 52 varies depending on the diameter of the $Bi_{12}SiO_2O$ single crystalline body 51. The diameter of the core portion 52 reaches about 20 mm in the case where single crystalline bodies having a diameter of about 80 mm as mentioned above have been pulled up.

The physical properties of this core portion 52 have been discussed in "Optical Qualities involved in Growth Facet of $Bi_{12}GeO_{20}$ Single Crystals": Technical Report of IEIEC Vol. 87, No. 373, pp. 21–27 (Study Report of Electronic Information and Communication Academy CPM 87-103~110, published Feb. 17, 1988 by Electronic Information and Communication Academy Corporation). According to this report, when $Bi_{12}GeO_{20}$ or $Bi_{12}SiO_2O$ single crystals are grown, facets are usually formed and in these facets are induced inclusion of impurities or crystalline defects.

In the facets, the lattice constant, photoabsorptive characteristics and photoconductivity are different from those in the other portions (off-facets or normal portions), and particularly it is said that strain has been developed in the crystals by mismatches of the lattice constant. Besides, it has been found that the color is different between the facet and off-facet and that the facet has a higher absorbency at 400–500 nm. Thus, it has been found that the facets are optically uneven portions, and it has been disclosed that the facets materially pose problems in photovoltaic sensors.

Such a facet is meant by the core portion 52 in FIG. 2. In order to manufacture recording members of real-time hologram elements, it can be envisaged that the recording member 53 is cut out so as not to include the core portion 52 therein. However, if the recording member 53 is so cut out, the size of the recording member 53 will be decreased. Particularly when it is assumed that the single crystalline body 51 has a diameter of about 80 mm which is the maximum value realizable at the present time and the core portion has a diameter of 20 mm, it is difficult to increase the size of the recording member 53 to 50 mm or more. Therefore, from the above-mentioned reasons, this could not be used as a recording member of real-time hologram elements.

The task of the present invention is, in the case where recording members of hologram elements comprising a $Bi_{12}SiO_{20}$ single crystal, to make it possible to manufacture large-size recording members and, at the same time, to prevent the deterioration of performances thereof as hologram elements.

Furthermore, the present inventors have succeeded in growing a large-size $Bi_{12}SiO_{20}$ single crystalline body having a diameter of 80 mm and a length of 100 mm by applying the above-mentioned process. From this single crystalline body, wafer having a size of about 50 mm×50 mm could be cut out. However, it has been found that this also poses the following problem.

Namely, it has been found that diffraction efficiencies of hologram elements appreciably vary depending on the impressed electric field during recording, more substantially, are increased proportionally to about a square of the electric field. Accordingly, in order to obtain bright hologramic images by increasing the diffraction efficiency of the hologram elements, it is necessary to increase the impressed electric field onto the recording members as much as possible. As this impressed electric field, for example, in the aforementioned literature: "Holography Record Characteristics of BSO single crystals", a value of several~8 kV/cm was employed and, particularly in order to provide a three-dimensional display on a practical level which utilizes binocular parallax, impression of an electric field of at least 2 kV/cm is required. The impression of such an electric field has not posed any problems in uses, as interference measurements or the like, to which small-size elements can be applied.

However, in the uses that require large-size elements as mentioned above, the value of the voltage to be impressed on the electrodes is noticeably increased in order to maintain a predetermined value of the electric field. For example, in order to impress an electric field of 2 kV/cm on a hologram element having a size of 50 mm×50 mm, a voltage of no less than 10 kV is required to be impressed. However, this imposes a big load upon electric sources and dangers of electrical discharges increase during the practical use, so that countermeasures for accidents, such as the electrical discharges or the like, are required and, therefore, practical elements can not be provided.

The task of the present invention is, in hologram elements comprising single crystals having a photoinducing refractive effect, to make it possible to record and reconstruct holograms by driving a relatively large-size hologram element, even when an electric source of low voltage is used.

A further task of the present invention is to provide elements which can increase brightness of reconstructed images than before. Additionally, the task of the present invention is to provide large-size hologram elements which can be driven by an ordinary electric source.

Furthermore, another task of the present invention is to provide hologram elements as well as hologram recording and reconstructing apparatuses by which hologramic images can be observed making use of binocular parallax.

A hologram recording and reconstructing method according to a first embodiment of the present invention, in obtaining reconstructed images by projecting object rays and reference rays on a volume hologram which comprises a material exhibiting a photoinducing refractive effect to record interference fringes in said volume hologram, and illuminating this volume hologram with reconstruction rays, is characterized in that when the wavelength $\lambda_1$ of the object rays is longer than the wavelength $\lambda_2$ of the reconstruction rays, the reconstruction is conducted by illuminating the volume hologram with a convergent spherical wave and that when the wavelength $\lambda_1$ of the object rays is shorter than the wavelength $\lambda_2$ of the reconstruction rays, the reconstruction is conducted by illuminating the volume hologram with a diffused spherical wave.

Furthermore, a hologram recording and reconstructing apparatus according to the first embodiment of the present invention is characterized by being provided with a volume hologram composed of a material exhibiting a photoinducing refractive effect, a mechanism for projecting object rays on the volume hologram, a mechanism for projecting reference rays on the volume hologram, and a mechanism for illuminating the volume hologram with a spherical wave as reconstruction rays.

The first embodiment of the present invention further relates to a hologram reconstruction rays projecting apparatus which is characterized by an apparatus for illuminating a volume hologram with reconstruction rays, provided with a light source of reconstruction rays for emitting reconstruction rays and a lens means for converting the reconstruction rays to a spherical wave, which lens means comprises a lens array comprising collective lenses arranged unidimensionally or two-dimensionally.

Furthermore, the second embodiment of the present invention relates to a hologram element provided with a recording member and electrodes for impressing voltage on this recording member, which is characterized in that the recording member consisting of a $Bi_{12}SiO_{20}$ single crystal grown by a pull-up method is a cutout from a single crystalline body which contains core and normal portions extending along the direction of the pull-up axis of this single crystalline body and that the recording member includes the core portion and the normal portion therein.

The second embodiment of the present invention further relates to a process for manufacturing hologram elements, which process is characterized in that, when a recording member of hologram elements consisting of a $Bi_{12}SiO_{20}$ single crystal grown by a pull-up method is cut out from a single crystalline body which contains core and normal portions extending along the direction of a pull-up axis of this single crystalline body, the recording member is cut out so that the core portion and the normal portion can be included in the recording member.

Further, the third embodiment of the present invention relates to a hologram element using, as a hologram material, a single crystal exhibiting a photoinducing refractive effect, which hologram element is characterized by being provided with a plurality of recording members comprising a single crystal, each recording member being set in an arrangement such that each light-illuminating surface of the recording members may compose a conjoint plane surface, and provided with a voltage impressing means for impressing voltage on each of the recording members.

Besides, the third embodiment of the present invention further relates to a hologram recording and reconstructing apparatus, which is characterized by being provided with a hologram element as mentioned above and an electric source for impressing voltage on each of the recording members.

Furthermore, a manufacturing process according to the third embodiment of the present invention, in the manufacture of hologram elements using, as a hologram material, a single crystal exhibiting a photoinducing refractive effect, is characterized by forming predetermined electrodes on surfaces of wafer consisting of the above-mentioned single crystal, joining plural sheets of the wafer with each others to provide a conjoint body, cutting this conjoint body and fabricating a hologram element comprising a plurality of recording members which are set in an arrangement such that each light-illuminating surface of every recording member may compose a conjoint plane surface and the above recording members are joined with each others.

The third embodiment of the present invention further relates to a process for manufacturing a hologram element in the manufacture of a hologram element using, as a hologram material, a single crystal exhibiting a photoinducing refractive effect, is characterized by forming predetermined electrodes on surfaces of wafer consisting of the above-mentioned single crystal, cutting the wafer to produce a plurality of hologram members and setting each of the hologram members in an arrangement such that each light-illuminating surface of every recording member may compose a conjoint plane surface.

BRIEF DESCRIPTION OF THE DRAWINGS

FIG. 2a is a perspective view showing a condition of cutting out a recording member 53 from a single crystalline body 51;

FIG. 2b plan view showing a condition of cutting out the recording member 53 from the single crystalline body 51;

FIG. 4a is a schematic view showing a condition wherein object rays and reference rays are incident on a volume hologram 5;

FIG. 4b is a schematic view of a condition wherein reconstruction rays are incident on the volume hologram 5;

FIG. 5 is a block diagram schematically showing a hologram recording and reconstructing apparatus according to another embodiment of the present invention;

FIG. 8a is a plan view showing an example of a micro lens array;

FIG. 8b is a schematic view showing proceeding directions of reconstruction rays forming an image in each micro lens;

FIGS. 9a, 9b, 9c are schematic views, respectively illustrating each proceeding direction of emergent rays being projected from a micro lens array on the volume hologram 5, and change of each focal position corresponding to each of he emergent rays;

FIG. 11a is a perspective view showing a condition of cutting out a recording member 54 from a single crystalline, body 51;

FIG. 11b is a plan view showing a condition of cutting out the recording member 54 from the single crystalline body 51;

FIG. 11c is a front view showing the recording member 54;

FIG. 12a is a perspective view showing a condition of cutting out a recording member 57 from the single crystalline body 51;

FIG. 12b is a front view showing the recording member 57;

FIG. 19a is a slant view showing an assembly 73;

FIG. 19b is a slant view showing element materials 74A 74B, 74C, 74D and 74E;

FIG. 19c is a slant view showing a condition of electrodes of the element materials facing each others;

FIG. 19d a is a slant view showing a hologram element 80;

FIG. 20 is a perspective view schematically showing a condition of a hologram element 80 connected with an electric source 81;

FIG. 21a is a slant view showing wafer 84;

FIG. 21b is a plan view showing the wafer 84 after chamfers 84d have been formed thereon;

FIG. 21c is a side view showing the wafer 84A viewed from the side-surface 84b side;

FIG. 22a is a plan view showing an assembly 85;

FIG. 22b is a front view showing the assembly 85;

FIG. 22c is a plan view showing element materials 87A, 8B, 87C and 87D which have been obtained by cutting the assembly 85;

FIG. 23a is a front view showing a conjoint body of the element materials;

FIG. 23b is a schematic view schematically showing a condition of a hologram element 92 connected with an electric source 81;

FIG. 25 is a schematic view showing a hologram recording and reconstructing apparatus according to further other embodiment of the present invention;

FIG. 26a is a plan view showing an assembly 85A (85B, 85C or 9) after an electrode has been formed on the wafer;

FIG. 26b is a front view showing a conjoint body obtained by stacking and joining each assembly;

FIG. 26c is a plan view showing a hologram element obtained by cutting this conjoint body; and FIG. 27 is a schematic view schematically showing an optical system used in a test for recording and reconstructing a hologram.

PREFERRED EMBODIMENTS OF THE INVENTION

This first embodiment of the present invention will be explained.

Though, as a material having a photoinducing refractive effect, photorefractive crystals and organic liquid crystal materials exhibiting a photoinducing refractive effect can be exemplified, these materials are not specifically limited. However, at the present time, $Bi_{12}SiO_{20}$ single crystals, $Bi_{12}GeO_{20}$ single crystals, $LiNbO_3$ single crystals or the like are preferred and inter alia the $Bi_{12}SiO_{20}$ single crystals having a high sensitivity of the photoinductive effect are particularly preferred.

A volume hologram is generally meant by a hologram at least 0.1 mm thick and the upper limit of its thickness is generally 10 mm.

In order to constitute a volume hologram, it is necessary to form electrodes on a material exhibiting a photoinducing refractive effect so that a predetermined driving voltage can be impressed on the hologram. As the electrodes, either transparent electrodes or opaque electrodes can be employed. As materials for such a transparent electrode, tin oxide membranes, indium tin oxide membranes or the like can be exemplified. Alternatively, as materials for the opaque electrodes, electroconductive cements containing an electroconducting material such as silver powder or the like, called a metallic paste, and metallic membranes of aluminum, gold, chromium, titanium or the like, can be exemplified.

Object rays, reference rays and reconstruction rays employable in the hologram recording and reconstruction are not specifically limited. However, the wavelength of the object rays must be within a range of wavelengths wherein volume holograms exhibit a photoconductive effect, and the wavelength of the reconstruction rays must be in a range of wavelengths wherein volume holograms do not exhibit a photoconductive effect. Therefore, the wavelength range of object rays is different from that of reconstruction rays. For example, in the case where $Bi_{12}SiO_{20}$ single crystals are used, an argon-ion laser line of wavelength 488 nm which allows the crystals to exhibit a photoinductive effect can be preferably employed as the object rays, and a helium-neon laser line of wavelength 633 nm which does not allow the $Bi_{12}SiO_{20}$ single crystals to exhibit a photoinductive effect can be preferably employed as the reconstruction rays.

Figure 1:
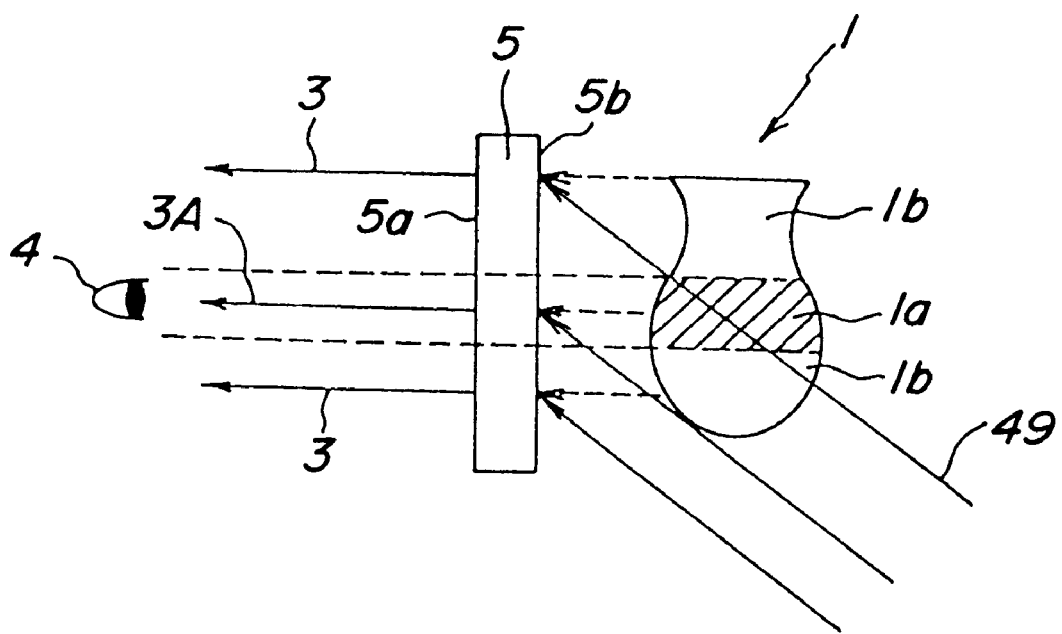
FIG. 1 is a schematic view illustrating limits for an observable range of a reconstructed image in a real-time holoram element in the first embodiment of the present invention.

The functions of the present invention will be further explained in detail hereinafter. For example, in the case where $Bi_{12}SiO_{20}$ single crystals are used, since holograms are several mm thick, diffraction images are obtained according to the Bragg's diffraction. Besides, from the above-described reason, the wavelength of the object rays projected on the volume hologram is largely different from that of the reconstruction rays. As the result of investigations conducted under these conditions, the present inventors have discovered the following fact. Namely, in apparatuses as shown in FIG. 1, the reconstruction rays are regarded as parallel beams and, therefore, the emergent rays 3 and 3A are also parallel beams. When a silver salt photosensitive material is used as a hologram, since diffracted rays are directed towards all directions from the surface of the hologram, no further investigations have so far been made.

In contrast therewith, the present inventors attempted to use a spherical wave as the reconstruction rays. As the result, it has been found that ranges of reconstructed images observable by human eyes are extremely enlarged, particularly, reconstructed images emerging from the hologram have been made viewable in their entirety, and the present invention has been accomplished.

Figure 3:
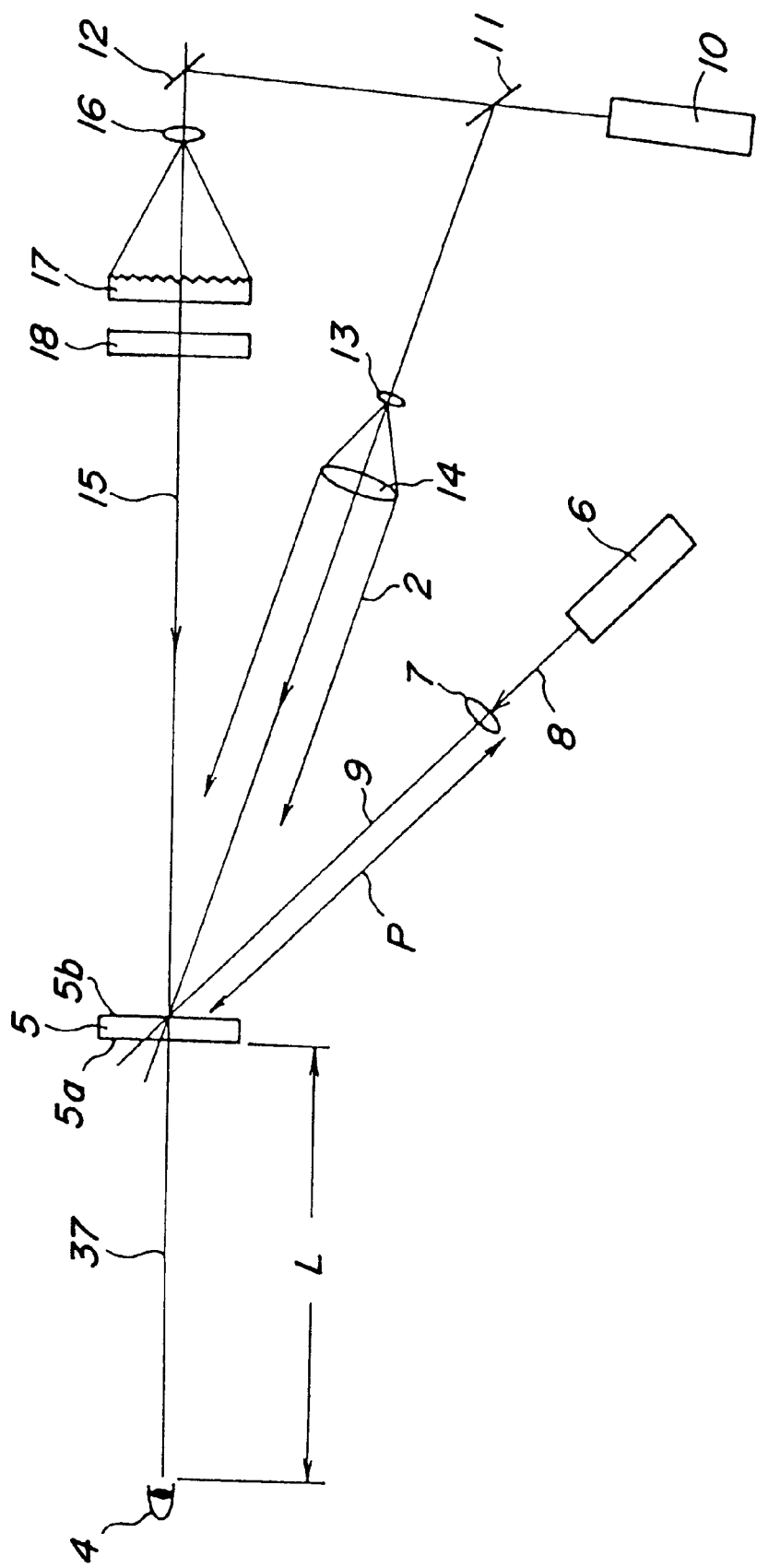
FIG. 3 is a block diagram schematically showing an apparatus according to an embodiment of the present invention.

The present inventors conducted further investigations on this system, and have succeeded in specifying the reason for the enlargement of the visible range of reconstructed images by the employment of the spherical wave and, particularly, substantial conditions under which the reconstructed images can be observed in their entirety. FIG. 3 is a block diagram schematically showing an apparatus according to the present invention, FIG. 4a is a schematic view illustrating projecting conditions of object rays and reference rays, and FIG. 4b is a schematic view illustrating illuminating conditions with reconstruction rays.

A volume hologram 5 was arranged in a predetermined position. A laser line of wavelength $\lambda_1$ was emitted from a light source 10 and this laser line was divided in two by a half mirror 11. One of these divided laser lines passes through a mirror 12, a lens 16 and a diffusion plate 17, which is scattered by the diffusion plate 17 and transmitted by transparent film 18 with an original picture printed thereon. The emergent beam from the film 18, as object rays 15, is projected on the hologram 5.

On the other hand, with respect to the laser line emitted from the light source 10, the line reflected by the half mirror 11 is transmitted by a collective lens 13 and a collimating lens 14 and projected, as reference rays 2, on the light-illuminating surface or the principal surface 5b of the hologram 5. The object rays 15 intersect the reference rays 2 at an intersectant angle of θ. Thus, the original picture is recorded as interference fringes in the hologram 5.

The object rays 15 are collected to converge upon a focal point T which is observable with a pupil 4 of a small diameter (cf. FIG. 4b). The reference rays 2 are collimated light. The position of the pupil (i.e., point of observation) is T. The distance between this focal point T and the hologram 5 is assumed to be L. When a y-axis of the hologram 5 which extends in parallel with the principal surfaces 5a and 5b thereof is set up and a perpendicular dropped from the focal point T to the y-axis intersects the y-axis at the point O, the axis connecting this intersectant point O with the focal point T is defined as an x-axis.

Conditions for the reconstruction rays to enable the interference fringes to be reconstructed will be studied hereinafter.

A laser line 8 is emitted from the light source 6 and transmitted by the collective lens 7. The hologram 5 is illuminated with the reconstruction rays 9 consisting of a spherical wave. It is necessary for the angle of incidence of the reconstruction rays to satisfy the Bragg's diffraction conditions with respect to the interference fringes recorded in the element. Here, the angle of incidence of the reconstruction rays 9 incident upon each point on the hologram 5 is assumed to be φ(y). The diffraction rays 37 for reconstructing the interference fringes form an image at a point in the distance L from the hologram 5. It is assumed that the wavelength of the object rays is $\lambda_1$ and the wavelength of the reconstruction rays is $\lambda_2$. It is further assumed that, when the interference fringes are recorded, the wave vector of the object rays 15 is $k_1$, the wave vector of the reference rays 2 is $k_2$, the wave vector of the reconstruction rays is $k_3$, and the wave vector of the interference fringes is Kf.

The wave vectors, $k_1$, $k_2$, $k_3$ and Kf satisfy the following relations at each point on the y-axis.

$$k_1 = \left(-L/(L^2+y^2)^{-1/2}\lambda, -y/(L^2+y^2)^{-1/2}\lambda_1\right) \quad (2)$$

$$k_2 = (-\cos\theta/\lambda_1, \sin\theta/\lambda_1) \quad (3)$$

$$kf = k_1 - k_2 \quad (4)$$

$$k_3 = (-\cos\phi(y)/\lambda_2, \sin\phi(y)/\lambda_2) \quad (5)$$

The Bragg's conditions between the wave vector of the reconstruction rays $k_3$ and the wave vector of the diffraction rays $k_4$ are as shown in the formulae (6) and (7):

$$k_4 = k_3 + kf \quad (6)$$

$$|k_4| = |k_3| = 1/\lambda_2 \quad (7)$$

From the formulae (6) and (7), the following formula (8) is obtained.

$$2k_3 kf + |kf|^2 = 0 \quad (8)$$

The formulae (2) to (5) are substituted into the formula (8). Here, supposing that the distance L of the point of observation from the hologram is sufficiently larger than y and θ~φ~0, and developing around the origin 0, the following formula (9) is obtained.

$$-2(1-\phi^2/2)[1-\theta^2/2-(1-(y/L)^2/2)]/\lambda_1\lambda_2$$

$$-2\phi[\theta+(y/L)/\lambda_1\lambda_2]+2[1+\theta y/L-(1-\theta^2/2)$$

$$(1-(y/L)^2/2)]/\lambda_1^2=0 \qquad (9)$$

Rearranging the formula (9) with respect to $\phi(y)$, the following formula (1) is obtained.

$$\phi(y)=(\lambda_2/\lambda_1)\cdot(\theta+y/L)/2+(\theta-y/L)/2 \qquad (1)$$

This formula (1) is in accord with a spherical wave within the range of y being sufficiently small as compared with L. This range is substantially in the range of y:L=1 or less:10. However, in the range of y:L=1 or less:4, it has been found that at least about a good reconstructed image can be obtained.

Alternatively, if the distance of the point of observation from the hologram is L, an entire reconstructed image formed by diffracted rays 37 can be observed with a pupil. However, even when the actual point of observation somewhat deviated from this distance, the entire image was visible within the permitted limit of the size of the pupil. The permissible limit of this distance was 30% or less. However, even if the position of the point of observation is off this permissible limit, since the range of the diffracted rays coming into the pupil is relatively wide as compared with conventional systems as shown in FIG. 1, the range of reconstructed images observable with a pupil is relatively widened.

Differentiating the formula (1) with respect to y, the following formula (10) is obtained.

$$d\phi/dy=(\lambda_2/\lambda_1-1)/2L \qquad (10)$$

Hence, when the wavelength $\lambda_2$ of the reconstruction rays is larger than the wavelength $\lambda_1$ of the object rays (i.e., $\lambda_2>\lambda_1$), the slope of the formula (10) becomes positive. This means that the reconstruction ray 9 satisfying the Bragg's conditions is a diffuse spherical wave. Alternatively, when the wavelength $\lambda_1$ of the object rays is larger than the wavelength $\lambda_2$ of the reconstruction rays (i.e., $\lambda_1>\lambda_2$), the slope of the formula (10) becomes positive. This means that the reconstruction ray 9 satisfying the Bragg's conditions is a convergent spherical wave.

In the apparatus shown in FIGS. 3 and 4, since the positions of the light source 6 and the collective lens are fixed, the focal point of the diffracted rays is also constant. Therefore, it is necessary for the pupil 4 either to be shifted to the constant position where the diffraction rays 37 are collected (the position distant by L), or to at least the vicinity thereto as mentioned above. Besides, in FIG. 4b, a diffuse spherical wave is projected as a reconstruction rays. However, for this purpose, it is necessary for the focus to be once formed in front of the hologram 5 by decreasing the focal length of the collective lens 7 so as to be smaller than the distance P of the volume hologram 5 from the collective lens 7 shown in FIG. 3. In contrast therewith, in order to project a convergent spherical wave as a reconstruction ray, it is necessary to increase the focal length of the collective lens 7 to become larger than the distance P of the volume hologram 5 from the collective lens 7 shown in FIG. 3.

The present inventors further have encountered the following problems. Namely, with the aforementioned hologram recording and reconstructing apparatus, it has been made possible to observe the entire reconstructed image. However, it is necessary therefor to arrange the viewpoint i.e. the position of the pupil 4, of the observer within a limited range of space. However, if the observation is conducted with a practical apparatus, a procedure for positioning the point of observation within a specified range of space is required on the first stage of observation and, furthermore, if the position of the pupil shifts in the course of observation, the reconstructed image becomes invisible. Therefore, in the present invention, on the stage of reconstruction, a detecting device for detecting the point of observation of a reconstructed image and a driving mechanism for shifting a collective point of the reconstruction rays corresponding to a signal from the detecting device are provided. Assuming that an intersectant angle made by object rays and reference rays projected on a volume hologram is $\theta$, a y-axis is set up in a direction parallel with the principal surfaces of the volume hologram. When a perpendicular dropped from the point of observation to the y-axis intersects the y-axis at an intersectant point O and the distance of the point of observation from the y-axis is L, the present invention is so constructed that the collective point of reconstruction rays can be shifted by the driving mechanism, so that the angle of incidence $\phi(y)$ of the reconstruction rays on the volume hologram at the position distant by y from the intersectant point O on the volume hologram may satisfy the above formula (1).

This embodiment will be further explained. The recording of interference fringes on the volume hologram 5 is assumed to be conducted as shown in FIGS. 3 and 4a. In FIG. 5, a structure of a reconstruction apparatus is schematically shown. The object rays and the reference rays, when they are projected on the volume hologram 5, intersect one another at an intersectant angle $\theta$. The point of observation 4 is in a distant L from the volume hologram 5. The center point of the volume hologram 5 is Q. A y-axis passing through the center Q is set up. A perpendicular dropped from the point of observation to the y-axis intersects the y-axis at O. In a direction perpendicular thereto, an x-axis is set up. In this embodiment, a mechanism 20 for illuminating the volume hologram 5 with a spherical wave 9 as reconstruction rays is provided with a laser source 6 and a collective lens 7. Here, an X-axis passing through the center Q is set up in the proceeding direction of the spherical wave 9, and a Y-axis is set up in the direction perpendicular thereto. Additionally, in FIG. 4, for convenience' sake of explanation, the angle of inclination of the X-axis against the x-axis is shown much greater than the actual angle of inclination.

The detecting device for detecting the point of observation of reconstructed images is provided with a camera tube 31, an image processer 32, a display 33 and a drive controller 34. It is assumed that the pupil 4 is positioned at a point $(L, y_0)$ on coordinates $(x, y)$. The position of the pupil 4 is detected by the camera tube 31, and informed to the image processer 32 to detect the coordinates. If required, the position of the pupil is displayed on the display 33. The signal of the coordinates is transmitted to the drive controller 34. The drive controller 34 is connected with a driving means (not shown in FIG. 5) for shifting the focal point of the reconstruction rays and controls this driving means. In this embodiment, by this driving means the whole mechanism 20 is shifted towards directions of the X-axis and Y-axis, whereby the coordinates $(X_0, Y_0)$ of the collective lens 7 are varied.

Here, in the range wherein the width of the volume hologram is sufficiently smaller than L, $y_0$ can be dealt with as being the same as $Y_0$. Namely, if $y_0$ of the point of observation 4 changes, the whole mechanism 20 is shifted corresponding therewith so that $Y_0$ may be in accord with $y_0$. Together therewith, the distance of the focal point of the collective lens 7 from the intersectant point O is changed by shifting the abscissa of $X_0$ of the collective lens 7. Thereby, can be controlled the angle of incidence of the reconstruction rays, $\phi(y)$, on the volume hologram at the position distant by y from the intersectant point O on the volume hologram. In this instance, the abscissa of $X_0$ of the collective lens 7 is shifted so that the angle of incidence $\phi(y)$ may satisfy the above-described formula (1). This relational formula is incorporated in the processer 32 which can control the coordinates $(X_0, Y_0)$ at real time.

In this embodiment, when the detection of the point of observation 4, the calculation of the coordinates $(X_0, Y_0)$ and the driving of the mechanism 20 constitute one cycle, it is preferred to conduct at least 30 cycles/sec. in order to prevent flickering of reconstructed images.

Figure 6:
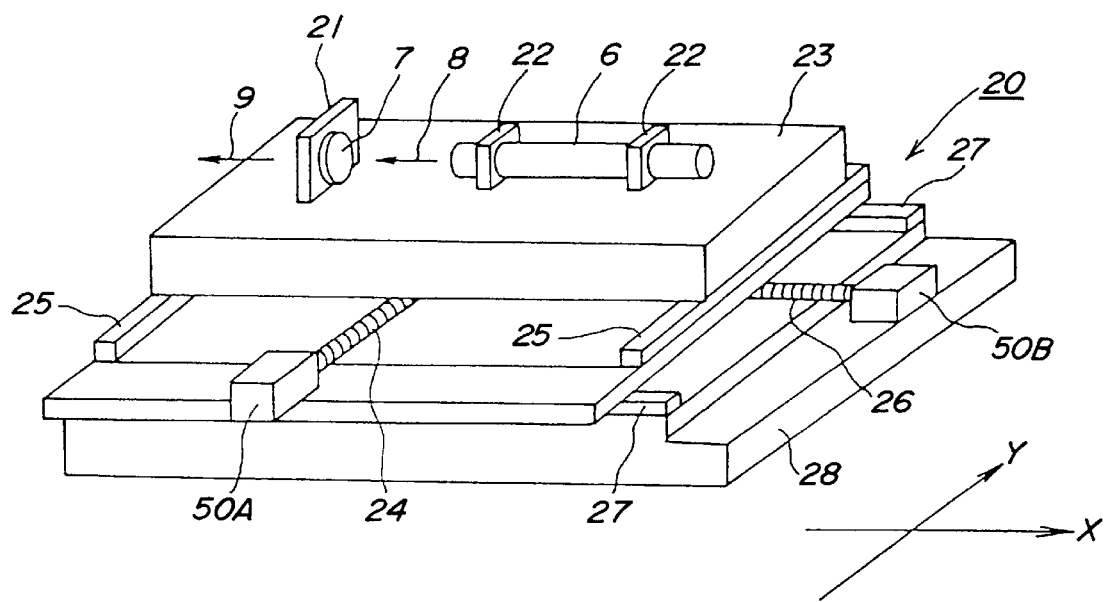
FIG. 6 is a slant view showing a device for projecting reconstruction rays which is used in the apparatus shown in FIG. 5

FIG. 6 is a slant view showing an embodiment of the mechanism 20 provided with this driving means. A laser source 6 is fixed on a bench 23 with holders 22 and a lens 21 is fixed on the bench 23 with a holder 21. The bench 23 is supported slidably on rails 25 and the bench 23 is mounted on a worm 24. The worm 24 is rotated by means of a pulse motor 50A to move the bench 23 in the direction of Y-axis. An integral whole of these mechanisms is further supported on transfer rails 27 and mounted on a worm 26. The rails 27 and worm 26 are attached to the bench 28. The worm 26 is rotated by a pulse motor 50B to move the bench 23 in the direction of X-axis.

Additionally, in the above mechanism 20, the laser source 6 and the collective lens 7 are moved concurrently. However, the laser source 6 and the collective lens 7 also may be attached to separate driving devices and moved severally.

As the collective lens, can be used various kinds of lenses to be employed in microoptics. However, gradient index rod lenses (GRIN) and lenses (distributed refractive index rod lenses) are particularly preferred.

Furthermore, the present inventors hit upon an idea of using, as a lens means, lens arrays having collective lenses set in a unidimensional or two-dimensional array, in the case where apparatuses for real-time hologram recording and reconstruction as described above are provided with, as a mechanism for illuminating a volume hologram with a spherical wave as the reconstruction rays, a reconstruction light source for emitting reconstruction rays and a lens means for converting the reconstruction rays to the spherical wave.

At first, such micro lens arrays will be explained. A distributed refractive index rod lens is cut to form lenses under the equal magnification erecter imaging condition and the resulting lenses are polished. These lenses are set in a unidimensional array or two-dimensional matrix and fixed, whereby a linear or planar body can be transmitted as an equiformal image. Such lens arrays are disclosed, for example, in Koichi Nishizawa: "Optical Mounting Technology of Microoptics", "The Journal of Japan Institute for Interconnecting and Packaging Electronic Circuits", Vol. 10, No. 5, pp. 315–319, 1995.

Figure 7:
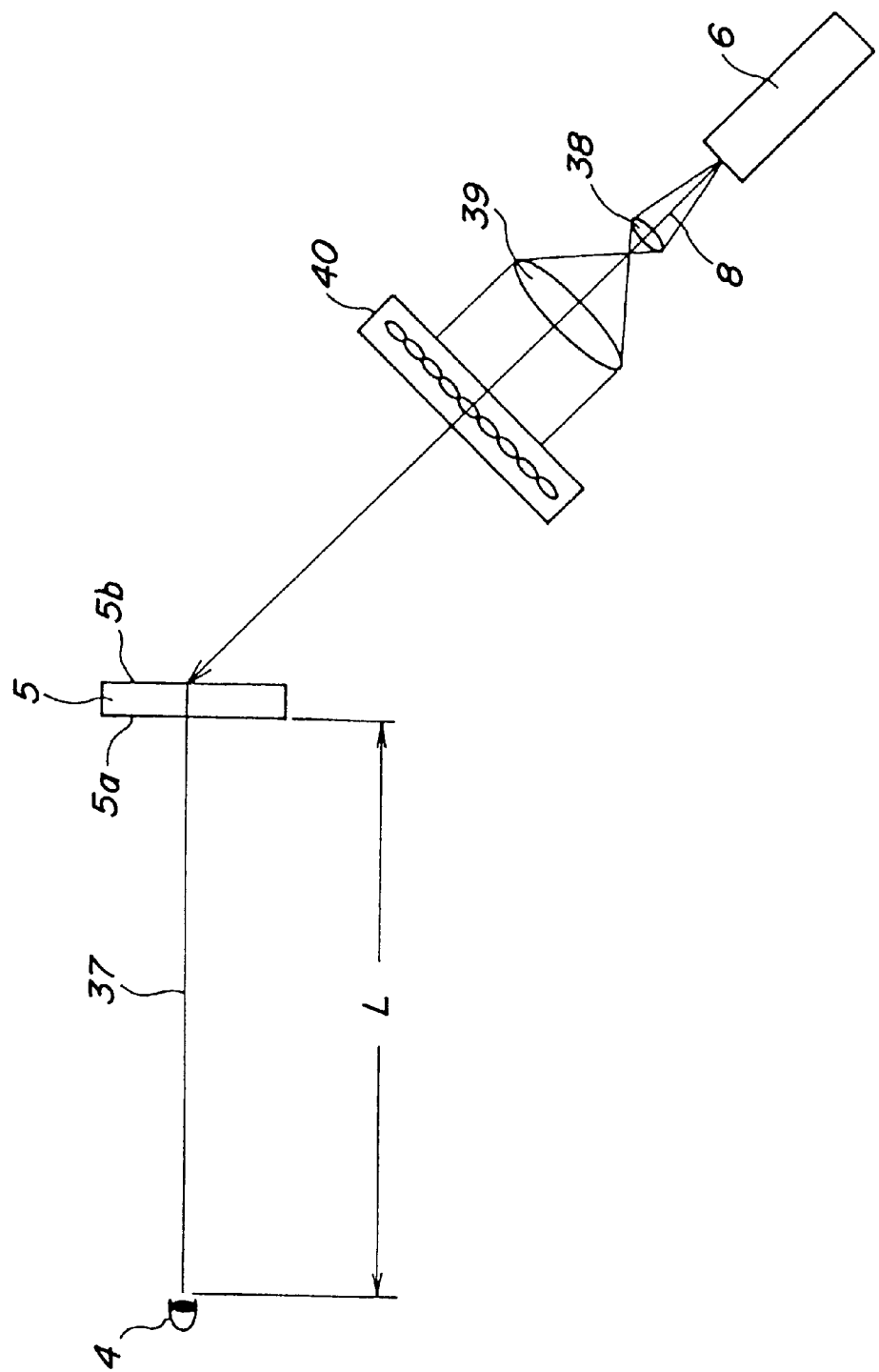
FIG. 7 is a block diagram schematically showing a hologram recording and reconstructing apparatus according to further the other embodiment of the present invention.

FIG. 7 is a block diagram showing a hologram reconstructing apparatus according to this embodiment. A laser line 8 emitted from a laser source 6 once forms a focus with a collective lens 38 and is projected as a diffuse spherical wave on a collimate lens 39. The collimate rays emerging from the lens 39 are projected on a microlens array 40 and then on a hologram 5. FIG. 8 is a plan view schematically showing an embodiment of such a microlens array 40. On a supporting plate 41 made of aluminum or the like, a predetermined number of microlenses 42 are arranged in a matrix form and fixed.

When such a reconstruction rays projecting mechanism is used, at the outset, the laser lines 8 from the light source are collected at a focal point 43 A with each microlens 42A, 42B, 42C, 42D or 42E, as shown in FIG. 8b. As the result, a diffuse spherical wave 44A is projected from the focal point 43A. The angle of incidence $\phi(y)$ of the diffuse spherical wave 44A on the volume hologram is determined according to the position of the focal point 43A, namely, determined at a constant value according to the focal length of each microlens.

However, simultaneously with the above, for example, as shown in FIG. 9a, emergent rays 44B of the laser lines 8, which have passed through both the microlenses 42B and 42D contiguous to the microlens 42C at their peripheral portions near to the microlens 42C, emerge spreading outwards with respect to the center of the microlens 42C, and form a focal point 43B. Thereby, the angle of incidence $\phi(y)$ of the reconstruction rays on the volume hologram 5 is varied. Further, for example, as shown in FIG. 9b, emergent rays 44C of the laser lines 8, which have passed through further outer microlenses 42A and 42E at their peripheral portions near to the microlenses 42B and 42D, respectively, emerge spreading outwards with respect to the center of the microlens 42C, and form a focal point 43C. The focal point 43C is formed at a position more distant from the microlens array than the focal point 43B. Thereby, numerous diffuse spherical waves having various focal lengths are simultaneously formed and illuminate the volume hologram 5.

Furthermore, for example, as shown in FIG. 9c, emergent rays 46A of the laser lines 8, which have passed through both the microlenses 42B and 42D adjacent to the microlens 42C at their peripheral portions near to the microlenses 42A and 42E, emerge converging inwards with respect to the center of the microlens 42C, and form a focal point 45. Furthermore, emergent rays 46B of the laser lines 8, which have passed through each of the microlenses 42A and 42E at their peripheral portions far from the microlens array 42C, emerge also converging inwards with respect to the center of the microlens 42C, and form a focal point at a position more distant from the microlens array than the focal point 45. In these cases, by arranging the volume hologram 5 between the microlens array and the focal point 45, numerous convergent spherical waves having various focal lengths are simultaneously projected on the volume hologram 5.

Thus, even if the position of the point of observation 4 is variously changed, reconstruction images corresponding thereto are visible from the point of observation 4.

In the microlens array, microlenses are preferred to be arranged at a pitch d of 5 mm or less, more preferably 3 mm or less. When the observer shifts the position of his viewpoint (the point of observation), too large pitches d for the size of the pupil will be liable to cause a flickering phenomenon of images. However, the pitches d of 5 mm or less can prevent such flickering. Besides, when the intersectant angle made by the optical axis of the object rays and the optical axis of the reference rays is $\theta$ and the focal length of the microlens is f, it is preferred to employ microlenses arrays satisfying the condition: $d/2\theta < f$. If $d/2\theta < f$ is satisfied, the reconstruction rays will not enter directly into the pupil of the observer, whereby the contrast of reconstructed images can be much improved.

EXAMPLE 1

Manufacture of a Hologram Recording and Reconstructing Apparatus

A boule of a $Bi_{12}SiO_{20}$ single crystal having a diameter of 80 mm and a length of 100 mm was manufactured. As a crucible, a cylindrical platinum crucible having a diameter of 150 mm and a height of 150 mm was used. 14 kg of a $Bi_{12}SiO_{20}$ sintered body was received in the crucible and heated at 900° C. to produce molten liquid. By using an after-heater made of platinum, the temperature gradient in the pull-up direction of the boule was adjusted to be 50–75° C./cm up to 10 mm above and 10° C./cm up to following 150 mm above. The pull-up rate was 1–1.5 mm/hour and the rotation rate of the pull-up shaft was 10 rpm. Characteristics of the obtained single crystal were shown in Table 1 below.

TABLE 1

| | |
|---|---|
| Lattice constant | $10.103 \times 10^{-10}$ m |
| Density | 9.2 g/cm$^3$ |
| Dielectric constant | 56 (100 kHz) |
| Refractive index | 2.53 ($\lambda$ = 633 nm) |
| Dark resistance | $10^{14} \Omega \cdot$ cm |
| Photoconductivity | $10^8 \Omega \cdot$ cm ($\lambda$ = 458 nm, 2.5 mW/cm$^2$) |
| Half-wave voltage | 3900 V ($\lambda$ = 633 nm) |
| Verdet's constant | $3.67 \times 10^{-3}$/Oe $\cdot$ cm ($\lambda$ = 633 nm) |
| | $9.33 \times 10^{-4}$/Oe $\cdot$ cm ($\lambda$ = 1150 nm) |

From this boule, a volume hologram 5 having a diameter of 80 mm and a thickness of 3 mm was cut out. A couple of principal surfaces of the hologram 5 were polished with a surface lapping machine to provide a flatness of 0.6 μm. Then, a transparent electrode membrane of indium phosphorus oxide was formed on the side surfaces of the volume hologram 5 by a spattering method.

Experiment of Hologram Recording and Reconstruction

Using an apparatus as shown in FIGS. 1, 3 and 4, an experiment of hologram recording and reconstruction was conducted. As object rays, an argon ion laser line of wavelength 488 nm was used. θ was made to be 10°. As reconstruction rays, a helium-neon laser line of wavelength 633 nm was used. The reconstruction rays were incident upon the center point Q of the volume hologram 5. The focal length f of the collective lens 7 was 40 mm. According to the above-described formula (1), dimension of each part was set up as follows. Namely, the distance L of the point of observation 4 from the volume hologram 5 was made to be 300 mm, the distance of the collective lens 7 from the volume hologram 5 was made to be 2059 mm and the angle of incidence of the reconstruction rays on the center of the volume hologram 5 was made to be 11.49°.

Figure 10:
FIG. 10 is a photograph showing a reconstructed image of a hologram which has been made to be observable by the apparatus according to the present invention.

The viewpoint was fixed at the above-defined position of the volume hologram 5, and the reconstructed image was observed. As the result, it was found that the reconstructed image had been reconstructed at the position corresponding to the original image, whereby the depth of the original image was also reproduced in the reconstructed holography. This image was shown in FIG. 10. The depth of this holography was recognizable by utilizing binocular parallax. Thus, according to the present invention, a three-dimensional display was successfully provided by a real-time hologram utilizing binocular parallax, by which the depth of an original image was precisely reproducible and recognizable with stereoscopic sense.

Additionally, the image thus recorded on the volume hologram was able to be erased by uniform blue-light illumination over the entire illuminating surface of the volume hologram, under the condition that the voltage impressed on the volume hologram was made to be 0 V.

EXAMPLE 2

A volume hologram 5 was manufactured in the same manner as Example 1. Using a hologram recording and reconstructing apparatus as shown in FIGS. 5 and 6, an experiment of hologram recording and reconstruction was conducted. As object rays, an argon laser line of wavelength 488 nm was used. θ was made to be 10°. As reconstruction rays, a helium-neon laser line of wavelength 633 nm was used. The focal length f of the collective lens 7 was made to be 40 nm. The angle of incidence of the reconstruction rays on the center of the volume hologram 5 was made to be 11.49°.

According to the formula (1), the position of the mechanism 20 was adjusted. Concretely, detecting the change of the position of the pupil, the position of the mechanism 20 was adjusted so that $Y_0=y_0$ and $X=x(mm)\times 6.73+40$ (mm) might be satisfied. As the result, it was found that the reconstructed image had been reconstructed at the position corresponding to the original image, whereby the depth of the original image was also reproduced in the reconstructed holography. Besides, a three-dimensional reconstructed image was able to be well recognized within the range of x=100 mm~500 mm and y=−100 mm~+100 mm.

EXAMPLE 3

A volume hologram 5 was manufactured in the same manner as Example 1. Using a hologram recording and reconstructing apparatus as shown in FIGS. 7 to 9, an experiment of hologram recording and reconstruction was conducted. As object rays, an argon laser line of wavelength 488 nm was used. θ was made to be 10°. As reconstruction rays, a helium-neon laser line of wavelength 633 nm was used. The angle of incidence of the reconstruction rays on the center of the volume hologram 5 was made to be 11.49°. The supporting plate 41 of the microlens array was an aluminum plate having a dimension of 120 mm×120 mm. As each microlens, a distributed refractive index rod lens having a diameter of 2 mm was used. The pitches d were 2.4 mm and the number of microlenses was 45×45.

As the result, it was found that the reconstructed image had been reconstructed at the position corresponding to the original image, whereby the depth of the original image was also reproduced in the reconstructed holography. Besides, a three-dimensional reconstructed image was able to be well recognized within the range of x=100 mm or more and y=−60 mm~+60 mm.

The second embodiment of the present invention will be explained hereinafter.

Following the common belief of persons having ordinary skill in the art that $Bi_{12}SiO_{20}$ single crystalline bodies as mentioned above are different in optical characteristics between their core portion (facet) and normal portion (off-facet) and optically uneven, the present inventors had so far cut out recording members avoiding the core portion as shown in FIGS. 2a and 2b. However, the present inventors, against this common belief, cut out a recording member which included the core portion and, with this recording member, determined sensitivity of diffraction efficiency in each of the core portion and normal portion, as explained hereinafter.

As the result, unexpectedly it was found that no difference in the diffraction efficiency was recognized between the core portion and the normal portion. The present inventors further conducted recording and reconstruction of a binary image and analogue image, respectively, with this recording member, with the consequence that it was found that no difference was made between them and either one could develop a good image. As the result, when recording members are cut out from single crystalline bodies, inclusion of a core portion in the cut-out recording members has become permissible, so the inventors have succeeded in enlarging the size of recording members.

Here, though single crystalline bodies can be pulled up in either direction of the <100> axis or <111> axis, it is preferred to pull up in the direction of the <100> axis in order to obtain particularly large-size single crystalline bodies. A particularly preferred pull-up method will be explained later on. In the case where the recording members have been pulled up along the <100> axis, it is preferred to cut out recording members so that the principal surfaces thereof may be the (011) face. In this case, recording members having the largest area can be cut out. Alternatively, recording members can be cut out so that the principal surfaces thereof may be the (100) face. In that case, single crystalline bodies can be cut out perpendicularly to the pull-up direction.

FIG. 11a is a perspective view illustrating a pull-up method according to the embodiment of the present invention, and FIG. 11b is a plan view of the single crystalline body 51. The main body 51a of the single crystalline body 51 has a cylindrical shape and on the top of the main body 51a, a nearly conical summit portion 51b is formed. The single crystalline body 51 has been pulled up in the direction of the <100> axis. In the central portion of the single crystalline body 51 is formed a core portion 52 around which a normal portion is formed.

The single crystalline body 51 is cut vertically to cut out a recording member 54. A couple of principal surfaces 54a of this recording member 54 are (011) faces, the longer side surfaces 54b are (01$\bar{1}$) faces and the shorter side surfaces 54c are (100) faces. As shown in FIG. 11c, this recording member 54 contains a narrow, long core portion 55 in the central portion and normal portions 56 on both sides of this core portion 55. Thereby, it has become possible to cut out recording members having a hitherto inexisted very large area.

FIG. 12a is a perspective view illustrating a method for cutting out a recording member 57 by cutting a single crystalline body 51 along the direction perpendicular to the <100> axis. A couple of principal surfaces 57a of this recording member 57 are directed towards the direction of the <100> axis, the side surfaces 57b are directed towards the direction of the <01$\bar{1}$> axis, and the side surfaces 57c are directed towards the direction of the <011> axis. As shown in FIG. 12b, the central portion of this recording member 57 contains a circular core portion 58, around which a normal portion 59 remains.

Figure 13:
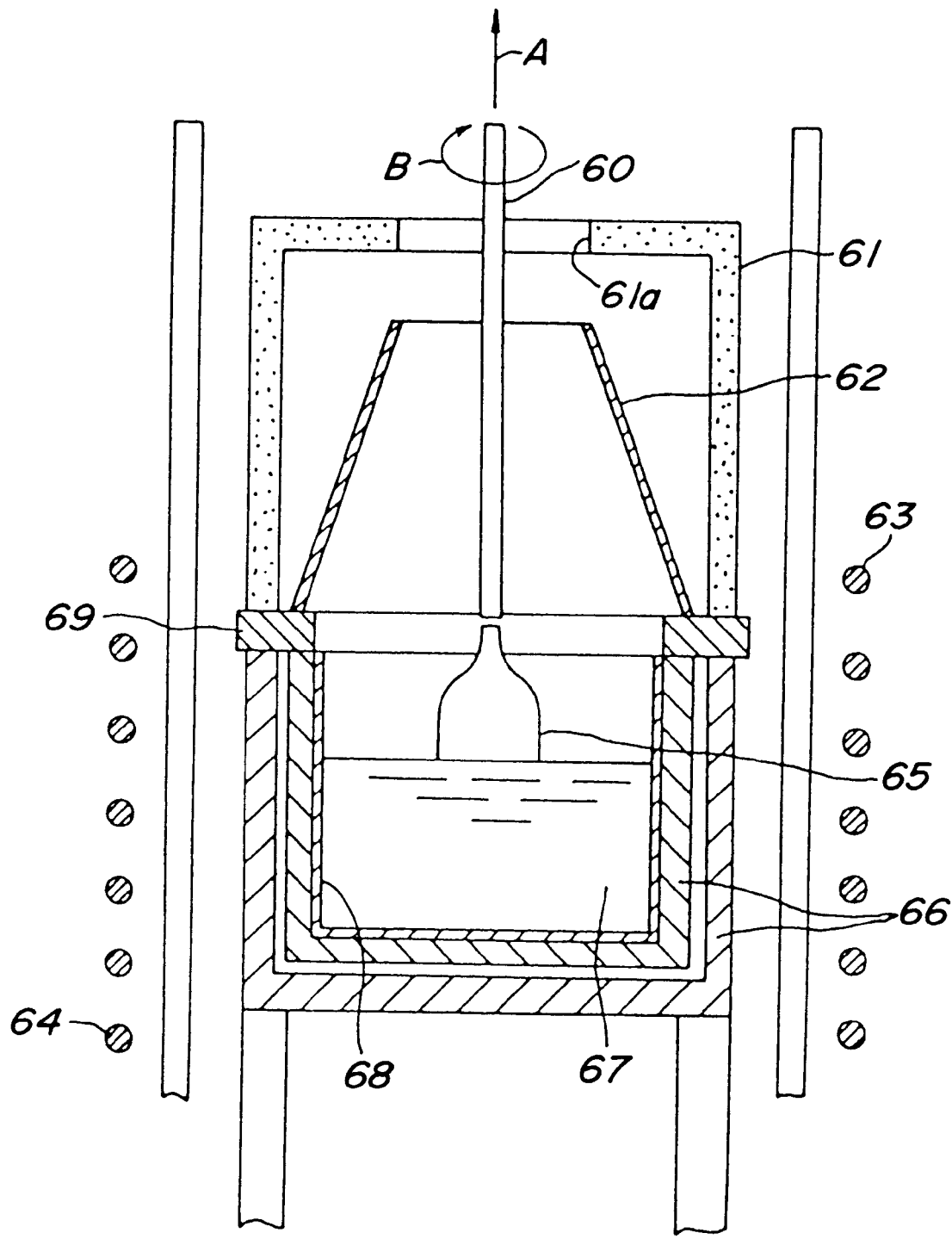
FIG. 13 is a sectional view schematically showing a manufacturing apparatus suited for manufacturing a $Bi_{12}SiO_{20}$ single crystal.

Then, the manufacturing method and characteristics of $Bi_{12}SiO_{20}$ single crystals which are particularly preferred in the present invention will be explained. FIG. 13 is a sectional view schematically showing an apparatus for pulling up single crystals which can be preferably employed in this manufacturing method. A crucible 68 preferably made of platinum is housed and installed inside refractory cases 66, which receives molten liquid 67. A high-frequency coil 63 is installed surrounding the refractory cases 68, which evolves heat to melt a material inside the crucible.

On the top of the refractory cases 66, another refractory case 61 is further mounted, inside which an after-heater made of platinum is installed. A pull-up shaft 60 is inserted through a window 61a of the refractory case 61 and the lower end of the pull-up shaft 60 is connected with a single crystalline body 65. As being rotated in the direction shown by the arrow B, this pull-up shaft 60 is pulled upwards as shown by the arrow A and the single crystalline body 65 is grown. 69 is a spacer.

Here, conditions for growing the above-mentioned single crystalline bodies are preferred to correspond to the conditions described in Japanese Patent Application No. Hei-1-234,399. Namely, a temperature gradient in the pull-up direction of the single crystalline body is preferred to be 50–75° C./cm from the surface of the molten liquid in the material receiving crucible up to 10 mm above and between 10° C./cm and 1° C./cm up to following 150 mm above. Besides, the temperature of the molten liquid is preferred to be 850–950° C. It is preferred to automatically control the diameter of the single crystalline body by means of a load-cell provided on the pull-up shaft.

Furthermore, the growing is preferred to be conducted in an oxidizing atmosphere, the pull-up rate is preferred to be 0.3 mm/hour to 4 mm/hour, and the rotation rate of the pull-up shaft is preferred to be 5–20 rpm. By such growth conditions, $Bi_{12}SiO_{20}$ single crystals can be provided with characteristics as follows and to which the present invention can be particularly preferably applied.

TABLE 2

| | |
|---|---|
| Lattice constant | $10.0~10.2 \times 10^{-10}$ m |
| Density | $9.1~9.3$ g/cm$^3$ |
| Dielectric constant | 54~58 (100 kHz) |
| Refractive index | 2.4~2.6 ($\lambda$ = 633 nm) |
| Dark resistance | $0.5~5 \times 10^{14} \Omega \cdot$ cm |
| Photoconductivity | $0.5~5 \times 10^{8} \Omega \cdot$ cm ($\lambda$ = 458 nm, 2.5 mW/cm$^2$) |
| Verdet's constant | $3.4~4.0 \times 10^{-3}$/Oe $\cdot$ cm ($\lambda$ = 633 nm) |

Regarding principles of holograms using $Bi_{12}SiO_{20}$ single crystals, the aforementioned document "Holographic Phase Characteristics of BSO Single Crystals" describes, and this can be used as a phase-type volume hologram. When this hologram is manufactured, electrodes are formed on two side surfaces of a recording member, which are connected with an electric source. As a material for such electrodes, ITO vapor-deposited membranes, electroconductive cements comprising an adhesive containing an electroconducting material such as silver powder, or the like, are preferred.

Further, as shown in FIGS. 11a and 11b, in the case where the principal surfaces 54a of the recording member 54 are directed towards the <011> axis, each electrode is preferred to be formed on the (01$\bar{1}$) face 54b. Then, object rays are projected in the direction perpendicular to the principal surface 54a and simultaneously therewith reference rays are projected to write an image in the hologram element. Then, the principal surface is illuminated with reconstruction rays projected from the same direction as the reference rays and the written image is reconstructed.

As the object rays and reference rays, can be preferably employed an argon ion laser line of wavelength 488 nm by which $Bi_{12}SiO_{20}$ single crystals exhibit a photoconductive effect, and as the reconstruction rays can be preferably employed a helium-neon laser line of wavelength 633 nm by which $Bi_{12}SiO_{20}$ single crystals do not exhibit a photoconductive effect.

Furthermore, it is particularly preferred to conduct recording and reconstruction by using volume hologram elements manufactured as described above, according to the first embodiment of the present invention.

Further a result of a concrete experiment will be described hereinafter.

EXAMPLE 4

A recording member 54 was cut out according to the method shown in FIG. 11, a hologram element was fabricated therewith and its recording and reconstruction characteristics were tested. More concretely, according to the aforementioned manufacturing method which had been explained with reference to FIG. 13, a single crystalline body 51 having a diameter of 80 mm and a length of 100 mm was manufactured. As a crucible, a cylindrical platinum crucible having a diameter of 150 mm and a height of 150 mm was used. 14 kg of a $Bi_{12}SiO_{20}$ sintered body was received in the crucible and heated at 900° C. to produce molten liquid.

By using an after-heater made of platinum, the temperature gradient in the pull-up direction of the single crystalline body 65 was adjusted to be 50–75° C./cm up to 10 mm above and 10° C./cm up to following 150 mm above. Besides, the pull-up rate was 1–1.5 mm/hour and the rotation rate of the pull-up shaft was 10 rpm. Characteristics of the obtained single crystal were shown in Table 3 below.

TABLE 3

| | |
|---|---|
| Lattice constant | $10.103 \times 10^{-10}$ m |
| Density | 9.2 g/cm$^3$ |
| Dielectric constant | 56 (100 kHz) |
| Refractive index | 2.53 ($\lambda$ = 633 nm) |
| Dark resistance | $10^{14}\Omega \cdot$ cm |
| Photoconductivity | $10^8 \Omega \cdot$ cm ($\lambda$ = 458 nm, 2.5 mW/cm$^2$) |
| Half-wave voltage | 3900 V ($\lambda$ = 633 nm) |
| | $3.67 \times 10^{-3}$/Oe $\cdot$ cm ($\lambda$ = 633 nm) |
| Verdet's constant | $9.33 \times 10^{-4}$/Oe $\cdot$ cm ($\lambda$ = 1150 nm) |

From this single crystalline body 51, a recording member 54 as shown in FIG. 11c was cut out by using an inner diameter-slicing machine, in a manner as shown in FIGS. 11a and 11b. From this recording member a flat plate sample having a dimension of 8 mm×8 mm×3 mm was cut out with an outer diameter blade grinding machine. Each principal surface 54a of this sample was subjected to optical polishing and electrodes were formed on two side surfaces 54b in the direction of the <01$\bar{1}$> axis, respectively, with an electro-conducting resin, and a hologram element was fabricated.

Figure 14:
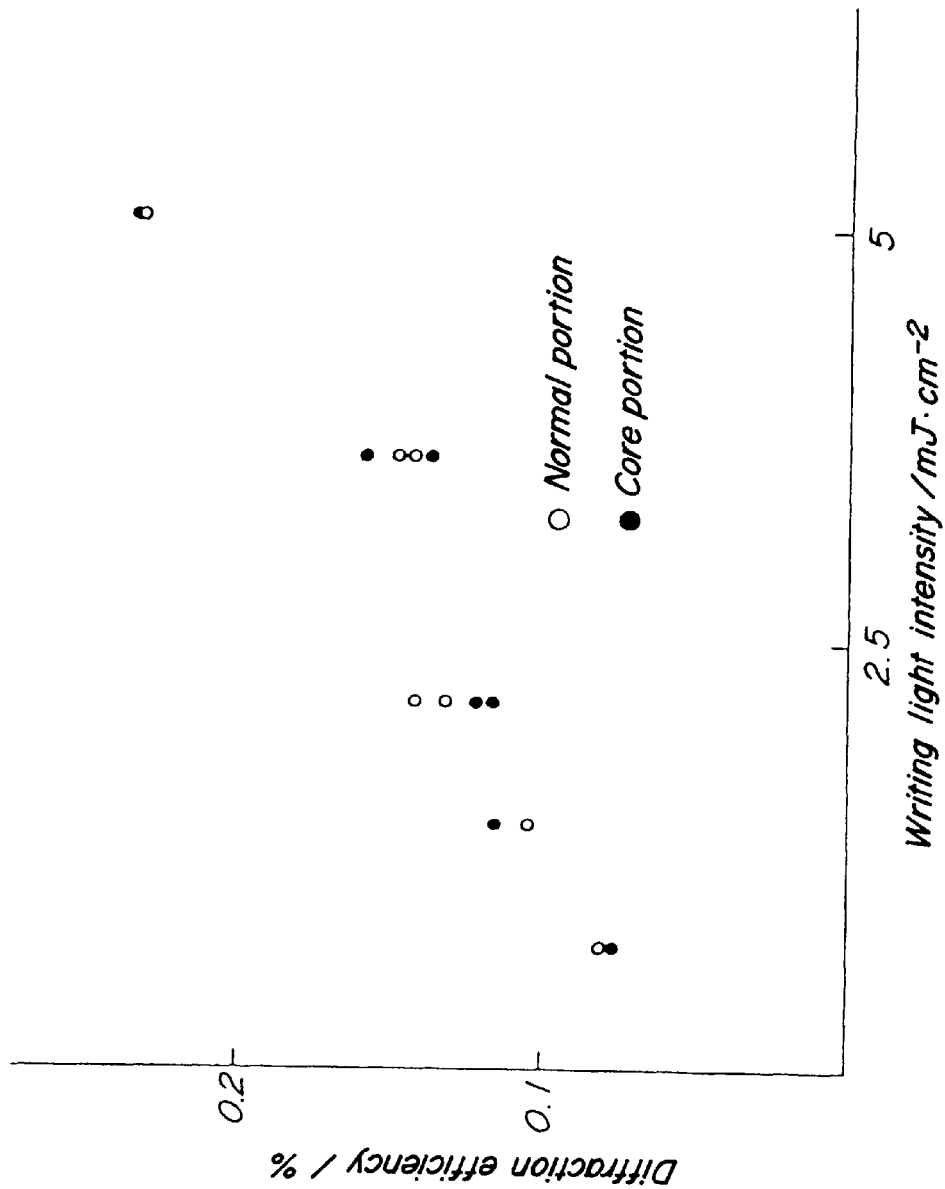
FIG. 14 is graph showing, when a recording member is cut to produce test pieces of small-size recording members and a hologram element is manufactured therewith, a relation between a writing light intensity and a diffraction efficiency in this hologram element with respect to both the core portion and normal portion.

By an argon ion laser line of wavelength 488 nm, interference fringes of 1301 p/mm were projected on the principal surface and the diffraction efficiency of the helium-neon laser line of wavelength 633 nm, incident with the Bragg's diffraction conditions was determined. In FIG. 14, the result of this determination is shown. In FIG. 14, the axis of abscissas is for intensity of writing light, the axis of ordinates is for diffraction efficiency, white circles are for characteristics of the normal portion, and black circles are for characteristics of the core portion. As is apparent from FIG. 14, it has been found surprisingly that no difference is made in the diffraction efficiency between the core portion and normal portion.

EXAMPLE 5

From the single crystalline body 51 manufactured in Example 4, a recording member 54 was cut out in the same manner as that of Example 4. The dimension of this recording member was 70 mm×70 mm×3 mm. On a couple of side surfaces 54b of this recording member 54 [faces of the direction of the <01$\bar{1}$> axis], electrodes were formed, respectively, with an electroconducting resin. Since the size of 70 mm×70 mm was larger than the distance of both eyes (usually about 50 mm), reconstructed images were made observable with binocular parallax.

Figure 15:
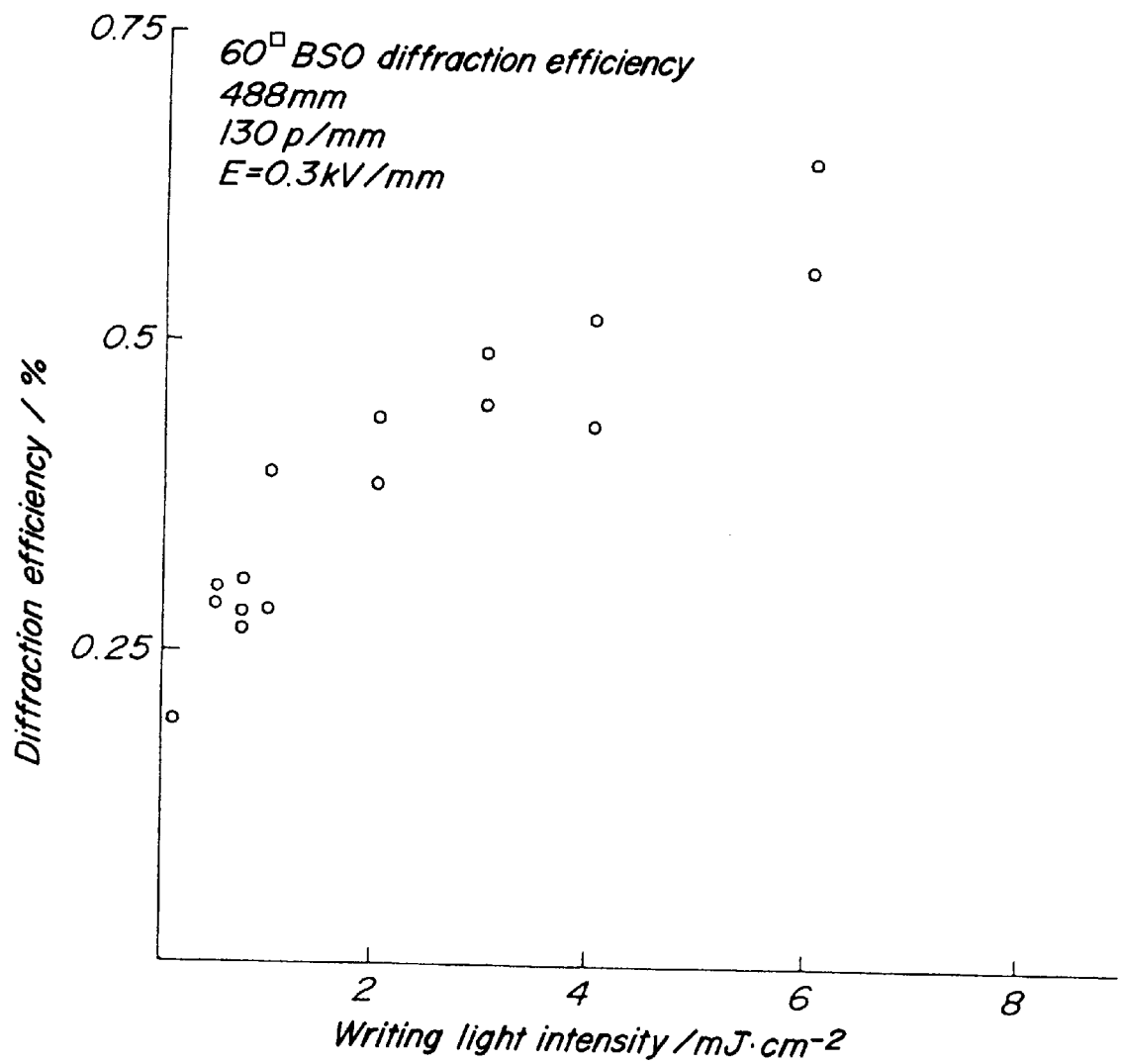
FIG. 15 is a graph showing, when a hologram element is manufactured with a recording member, a relation between a writing light intensity and a diffraction efficiency in this hologram element.

By an argon ion laser line of wavelength 488 nm, interference fringes of 1301 p/mm were projected on the principal surface 3a and the diffraction efficiency of the helium-neon laser line of wavelength 633 nm satisfying the Bragg's diffraction conditions was determined. Impressed voltage between both the electrodes was 20 kV of direct current. In FIG. 15, is shown the result of the determination of sensitivity characteristics of this diffraction efficiency.

In FIG. 15, the axis of abscissas is for writing light intensity and the axis of ordinates is for diffraction efficiency. As is seen from FIG. 15, a diffraction efficiency of 0.5% was obtained by projecting rays having an energy of at least 4 mJ/cm$^2$.

Figure 16:
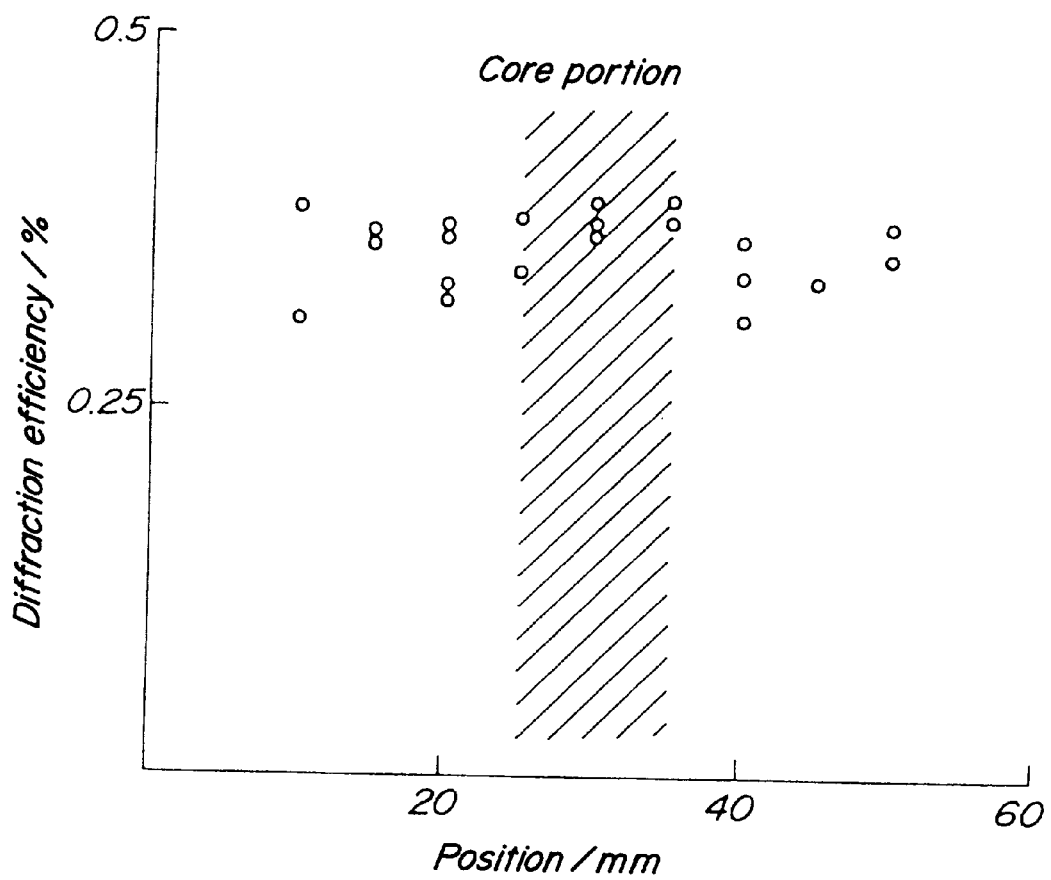
FIG. 16 is a graph showing, when a hologram element is manufactured with a recording member, a relation between a position of each point of this hologram element and a diffraction efficiency in each point.

Then, in order to confirm uniformity of each point on the hologram element, the diffraction efficiency in each point on the element was determined. The result of this determination is shown in FIG. 16. In FIG. 16, an abscissa represents the distance of a point on the principal surface 54a from the side surface 54b, and an ordinate represents a diffraction efficiency at each point. As is apparent from FIG. 16, no difference was made in the diffraction efficiency between the normal portion and core portion, and substantially a uniform diffraction efficiency was obtained on any portions. This is in accord with the above-mentioned result of Example 4.

EXAMPLE 6

An experiment of reconstruction of binary images and analogue images was conducted with the hologram element fabricated in Example 5. Namely, each original image was written on transparent film. On this transparent film, a scattering light of wavelength 488 nm was projected and the scattering light transmitted by the transparent film was used as object rays. The object rays were projected in the direction perpendicular to the principal surface 54a, and simultaneously therewith, collimated reference rays were projected on the principal surface 54a to record each image on the hologram. The transparent film having an original image recorded had a dimension of 100 mm×100 mm and was arranged at a position 600 mm distant from the principal surface of the hologram element. Then, the principal surface was illuminated with reconstruction rays of wavelength 633 nm and the hologram was reconstructed.

Figure 17:
FIG. 17 is a photograph showing a binary image which has been reconstructed with a hologram element using a large-size recording member.
Figure 18:
FIG. 18 is a photograph showing an analogue image which has been reconstructed with a hologram element using a large-size recording member.

FIG. 17 shows the thus obtained reconstructed image of a binary image, and FIG. 18 shows a reconstructed image of an analogue image. Though speckle noises appear, good images have been reconstructed. Each of these images was able to be observed directly with naked eyes, and then the position of the reconstructed image corresponded to the position where the film of the original picture was placed and the depth was precisely reproduced and recognizable with both eyes. From this result of the experiment, it has been demonstrated that hologram elements using a $Bi_{12}SiO_{20}$ d single crystal can be applied to three-dimensional displays.

As described above, according to the second embodiment of the present invention, when recording members are cut out from a single crystalline body, inclusion of a core portion in the recording members has become permissible, so that the size of recording members can be enlarged with success. Besides, this hologram element has made it possible to observe binary images or analogue images by binocular parallax and thereby directly observe a depth corresponding to the depth of the original image.

Then, the third embodiment of the present invention will be explained.

The present inventors have repeatedly conducted studies for producing large-size hologram elements and obtaining bright hologram images. In the course of these studies, the present inventors hit upon an idea for forming, as hologram elements, an integral conjoint body of plural hologram members. Namely, a plurality of recording members consisting of a single crystal are manufactured. In this case, it is necessary to form predetermined electrodes so that the crystalline orientation in the voltage impressing direction may be the same in every recording member. Then, an integral hologram element was provided by setting every recording member in an arrangement such that each light projecting surface of the recording members may conjointly compose an integral flat surface. In this case, a voltage impressing means was provided so as to allow voltage to be impressed on every recording member.

Thereby, hitherto inexsisted large-size hologram elements have become manufacturable. Moreover, since the voltage is impressed independently on each recording member, the intensity of the electric field within each recording member is determined solely by the dimension of each recording member and the voltage impressed on each recording member, and not affected by the integral size of the hologram elements. Therefore, brightness of hologram reconstructed images can be readily enhanced by increasing the diffraction efficiency of each recording member. Besides, even if the size of the hologram elements is increased, no deterioration of integral diffraction efficiency would occur, and even if a small scale electric source is used, the brightness of the hologram reconstructed images could be put on a practicable level.

Consequently, the present inventors have first succeeded in providing practical hologram elements suited for application in output instruments of three-dimensional images, particularly making use of binocular parallax.

Further, the electric field applied to each recording member can be augmented not only by increasing the size of the hologram elements but also by decreasing the size of each recording member constituting the hologram elements. Therefore, even when an electric source of voltage the same as before is used, a diffraction efficiency much higher than before can be obtained, so that brighter images can be formed. This is extremely effective for elements to be applied in interference measurements and optical information processing, or other optical elements.

In a preferred embodiment of the present invention, the hologram elements comprise a plurality of hologram members, each of the hologram members is provided with two electrodes each formed on opposite side surfaces thereof, each of the electrodes is formed so that the crystalline orientation in the voltage-impressing direction may be the same in every recording member, and electrodes adjacent to each other of the hologram members are conjoined together.

In this embodiment, in order to join each hologram member with others, adjacent electrodes can be mutually conjoined. In this case, the electrodes conjoined together have the same polarity. Alternatively, an insulator can be interposed between electrodes of adjacent hologram members. In this case, the polarities of the electrodes in both sides of the insulator can be either different or the same.

In this embodiment, it is preferred that each hologram member is joined with others to form an integral conjoint body.

Further, in a preferred embodiment of the present invention, a common electrode can be provided for impressing a voltage simultaneously on adjacent recording members. Namely, one common electrode can be used for each recording member. Thereby, the construction of the hologram elements is further simplified and the manufacturing cost is further decreased. In this embodiment, each recording member is stacked on other and the recording members can be integrated by applying a pressure on this stacked body in the direction perpendicular to the electrode. In this case, it is very easy to replace a part of the recording members or change the number of the recording members, after stacking of the recording members.

Further, in this embodiment, integration can be performed by conjoining recording members together. In this case, it is easy to deal with the conjoint body of recording members and, furthermore, the conditions of the voltage applied to each recording member are stabilized.

As single crystals having a photoinducing refractive effect, $Bi_{12}SiO_{20}$ single crystals, $BaTiO_3$ single crystals, $LiNbO_3$ single crystals or the like are preferred, and inter alia $Bi_{12}SiO_{20}$ single crystals having a high sensitivity for photoinducing effect are particularly preferred. As electrodes to be formed on each recording member, can be used either the transparent electrodes or opaque electrodes. As a material for the transparent electrodes, tin oxide membranes, indium tin oxide membranes or the like can be exemplified. Alternatively, as a material for the opaque electrodes, can be exemplified electroconductive cements containing an electroconducting material such as silver powder, which are called metallic paste, and metallic membranes such as aluminum, gold, chromium, titanium or the like.

When the hologram members are arranged, as a cementing material for cementing adjacent electrodes, can be exemplified epoxy bonding adhesives, silicone bonding adhesives, acrylic bonding adhesives and PVB bonding adhesives. Further, it is preferred to mitigate influences of stresses built up due to curing reactions or differences in thermal expansion, by adding a plasticizer, if required.

According to the present invention, though the electrodes are formed so that the crystal orientations in the voltage impressing direction may be the same in every recording member, the orientations are not specifically limited. However, when the light-illuminating surfaces of each hologram element is directed towards of the <011> axis and electrodes are formed on two (01$\bar{1}$) faces, the highest diffraction efficiency can be obtained.

In the present invention, the electrodes of each recording member can be transparent electrodes. In this case, interference fringes are not recorded in portions corresponding to the electrodes. When hologram reconstructed images are observed, both eyes are positioned opposite to the light-illuminating surface of the hologram element and look into the reconstructed image. In this case, at portions where the transparent electrodes exist, a blank is left on the hologram image. Accordingly, in the case where the shape of the electrodes is a straight line shape, the hologram images are divided by a lattice consisting of a plurality of blank streaks.

In contrast therewith, in the case where the electrodes are opaque electrodes, optically the same thing as above also occurs. However, at portions where the opaque electrodes exist, as the light is cut off, a dark lattice is exhibited. When such a lattice having a predetermined shape is projected in hologram images, since this lattice forms a kind of screen or frame, a large effect in visual sense is resulted.

However, in the above, if the position of both eyes (viewpoint) of observers is fixed, the hologram image at the position of the above-described lattice can not be observed. However, when the position of both eyes of observers is shifted, the position of the lattice existing in the hologram images also moves, following the movement of the position of both eyes. In consequence thereof, the portions which have been hidden behind the lattice before the shift of both eyes are revealed and become observable after the above shifting. On the other hand, the portions which have appeared on hologram images before the above shifting are partly hidden behind the lattice after the above shifting.

In the hologram recording and reconstructing apparatus of the present invention, a common electric source is connected with every hologram element, the positive pole of the common electric source can be connected with one electrode each of plural hologram elements and the negative pole of the electric source can be connected with another electrode each of the plural hologram elements. Thereby, voltage applying conditions in every hologram element can always be kept uniform and the whole body of the recording and reconstructing apparatus can be made in a small-size.

The $Bi_{12}SiO_{20}$ single crystals are manufactured nowadays by a pull-up process. The single crystals can be pulled up in either direction of the <100> axis or <011> axis. However, in order to obtain particularly large-size single crystals, it is preferred to pull up in the direction of the <100> axis. In the case where the recording members are pulled up along the <100> axis, it is preferred to cut out a recording member so that its principal surfaces may be directed towards the <011> axis. In this case, wafer having a largest area can be cut out. Alternatively, the recording member can be cut out so that its principal surfaces may be directed towards the <100> axis, and in this case, the single crystal can be cut out perpendicularly to the pull-up direction thereof.

The embodiments of the present invention will be explained in more detail hereinafter with reference to the drawings.

At the outset, a preferred cut-out method of $Bi_{12}SiO_{20}$ single crystal wafer will be explained. FIG. 2a is a perspective view showing a condition of cutting out wafer from a single crystalline body 51, and FIG. 2b is a plan view showing the condition of cutting out wafer from a single crystalline body 51. The main body 51a of the single crystalline body 51 has a cylindrical shape with a nearly conical shaped summit portion 51b formed at the top portion. The single crystalline body 51 has been pulled up towards the direction of the <100> axis.

In this embodiment, the wafer 53 is cut out by cutting the single crystalline body 51 vertically. A couple of the principal surfaces 53a of this wafer 53 are directed towards the <011> axis, the longer side surfaces 53b are (01$\bar{1}$) faces and the shorter side surfaces 53c are (100) faces. This wafer 53 has been cut out parallelly with the core portion 52 so as not to include the core portion 52 In this respect, explanation will be supplemented.

$Bi_{12}SiO_{20}$ single crystals have growth rates considerably different in every direction of the crystalline orientation, so that a region 52 having a high impurity concentration, which is called a core portion, is formed in the central portion of the single crystalline body 51. This core portion 52 has a nearly cylindrical shape extending along the pull-up direction of the single crystalline body 51. The diameter of the core portion 52 varies dependent on the diameter of the $Bi_{12}SiO_{20}$ single crystal. In the case where single crystalline bodies having a diameter of about 80 mm as above are pulled up, the diameter of the core portion reaches about 20 mm.

In this core portion (facet), the lattice constant, light absorption characteristics and optical conductivity are different from those of the other portion (off-facet, normal portion), particularly, the crystal is said to have strain produced due to mismatches of the lattice constant.

Furthermore, it has been found that color is different between the facet and off-facet, and the facet has a larger absorption index at 400–500 nm. Thus, it has been found that the facet is a optically uneven portion.

Therefore, in the case where wafer is cut out avoiding the core portion 52 as shown in FIG. 2, if the diameter of the single crystalline body 51 is about 80 mm that is the maximum value realizable at the present time and the diameter of the core portion is 20 mm, the size of the wafer 54 will be at most about 50 mm.

FIG. 11a is a perspective view which illustrates a method for cutting out according to another embodiment, and FIG. 11b is a plan view illustrating the same. This single crystalline body 51 also has been pulled up in the direction of the <100> axis. In the central portion of the single crystalline body 51, a core portion 52 has been produced, around which a normal portion is produced.

The single crystalline body 51 is cut vertically to cut out wafer 54. A couple of principal surfaces 54a of this wafer 54 are (011) faces, the longer side surfaces 54b are (01$\bar{1}$) faces and the shorter side surfaces 54c are (100) faces. As shown in FIG. 11c, this wafer 54 contains a narrow, long core portion 55 in the central portion, and normal portions 56 on both sides of the core portion 55. Thereby, hitherto inexisted recording members having an extremely large area have become able to be cut out. Moreover, according to the discovery made by the present inventors, it has been found that in respects of the diffraction efficiency as hologram members as well as the brightness of images, no differences are made between the core portion 55 and normal portion 56 in the recording member 54.

Additionally, the aforementioned embodiments do not limit the cut-out direction of the wafer. For example, the wafer can be directed towards the direction of the <100> axis, by cutting it out perpendicularly to the <100> axis of the single crystalline body 51. In this case, since the light-illuminating surface of the recording member is directed towards the direction of the <100> axis, it is necessary to project light beams on the light-illuminating surface with an oblique angle inclined against the perpendicular direction. The angle of incidence of the light beam on the light-illuminating surface is preferred to be 30–60°, more preferably 40–50°, furthermore preferably 45°.

As object rays and reference rays employable in hologram recording and reconstructing apparatuses, argon ion laser line of wavelength 488 nm by which $Bi_{12}SiO_{20}$ single crystals exhibit a photoconductive effect can be preferably used. As reconstruction rays, helium-neon laser line of wavelength 633 nm by which $Bi_{12}SiO_{20}$ single crystals do not exhibit a photoconductive effect can be preferably used.

In such a manner, wafer is cut out and then treated as mentioned below, to provide hologram members of the present invention. The preferred embodiment will be explained. As shown in FIG. 19a, membraneous electrodes 71A and 71B are formed on a couple of principal surfaces of rectangular wafer 72, respectively, to fabricate an assembly 73. Then, as shown in FIG. 19b, this assembly 73 is cut to produce, for example, 5 pieces of element material, 74A, 74B, 74C, 74D and 74E. The number of element materials produced from one assembly 73 can be variously changed. Each element material is provided with a slender recording member 75 and electrodes 76A and 76B formed on both side surfaces of this recording member 75, respectively.

Then, as shown in FIG. 19c, every element material is turned in the same direction as shown by the arrow C until each electrode comes to face other, of every element material. In this state, electrodes facing each other of every element material are joined to make the surfaces of the recording members contiguous, whereby a conjoint light-illuminating surface is formed. By subjecting this light-illuminating surface to optical polishing with a flat polishing machine, a hologram element 80 as shown in FIG. 19d can be provided.

This hologram element 80 is a conjoint body consisting of 5 pieces of hologram members 77A, 77B, 77C, 77D and 77E, and each hologram member is composed of a slender recording member 75 and electrodes 76A and 76B formed on both side surfaces of this recording member 75, respectively. The electrodes 76A and 76B of adjacent hologram members are joined with each other. Besides, light-illuminating surfaces 78 of the recording members 75 of the hologram member lie substantially in succession forming a light-illuminating surface 79 which functions as a light-incident surface for object rays and reference rays.

FIG. 20 is a schematic view schematically showing a preferred embodiment of hologram recording and reconstructing apparatuses using this hologram element 80. A common direct current electric source 81 is used. The positive pole of this electric source 81 is connected by lead wires 82 with the electrode 76B of the hologram member 77A and the electrode 76A of the member 76B; the electrode 76B of the member 77C and the electrode 76A of the member 77D; and electrode 76B of the member 77E. This substantiated connecting method can be changed variously. Further, the negative pole of the electric source 81 is connected by lead wires 83 with the electrode 76A of the member 77A; the electrode 76B of the member 77B and the electrode 76A of the member 77C; the electrode 76B of the member 77D and the electrode 76A of the member 77E.

A further substantial, preferred embodiment will be explained. At the outset, according to the method shown in FIG. 2 or FIG. 11, wafer 84 as shown in FIG. 21a is cut out. In this instance, a couple of principal surfaces 84a of the wafer 84 are directed towards the direction of the <011> axis, the side surfaces 84b are directed towards the direction of the <01$\bar{1}$> axis and the side surfaces 84c are directed towards the direction of the <100> axis.

The side surfaces 84c of this wafer 84 are ground-finished to provide wafer 84A as shown in FIGS. 21b and 21c. Of this wafer 84A, ridges 85 between the side surfaces 84c and the principal surfaces 84a (cf. FIG. 21a) are removed to form a narrow, long chamfers 84d.

Then, on a couple of the principal surfaces 84a and the chamfers 84d of this wafer 84A, membraneous electrodes are formed to provide an assembly 85 as shown in FIGS. 22a and 22b. Here, membraneous electrodes 86A and 86B are formed on each principal surface 84a and chamfer 84d of the wafer 84A, respectively. Then, as shown in FIG. 22b, the assembly 85 is cut to produce, for example, 4 pieces of element material, 87A, 87B, 87C and 87D. Each element material comprises a slender recording member and electrodes 86A and 86B formed on both side surfaces of this recording member, respectively.

Then, the element materials 87A, 87B, 87C and 87D are turned in the same direction as shown in FIG. 23a, until each electrode of the element materials comes to face other. In this state, the mutually facing electrodes of every element material are joined together and the surfaces of the recording members 84B are made contiguous to form a conjoint light-illuminating surface. On this stage, a couple of chamfers 84d are paired between adjoining element materials, to thereby form a groove 88. Then, by optically polishing this light-illuminating surface with a flat polishing machine, a hologram element 92 as shown in FIG. 23b can be obtained.

This hologram element 92 consists of a conjoint body comprising 4 hologram members 89A, 89B, 89C and 89D, each hologram member comprising a narrow, long recording member 84C and electrodes 86A and 86B formed on both side surfaces of this recording member 84C, respectively. Electrodes 86A and 86B on adjoining hologram members are conjoined together. The polished light-illuminating surfaces 78 of the recording members 84C of each hologram member are substantially contiguous to form a light-illuminating surface 90 which functions as a light-incident surface for object rays and reference rays.

In this apparatus, a common, direct current electric source 81 is used. An end of the lead wire 82 extending from the positive pole of the common electric source 81 is bonded with cement 91B to the electrodes 86A and 86B on the surface of the groove 88 formed between the hologram members 89A and 89B, and bonded with cement 91D to the electrodes 86A and 86B on the surface of the groove 88 formed between the members 89C and 89D. An end of the lead wire 83 extending from the negative pole of the common electric source 81 is bonded with cement 91A to the electrode 86A on the surface of the chamfer 84d of the hologram member 89A, bonded with cement 91C to the electrodes 86A and 86B on the surface of the groove 88 formed between the members 89B and 89C, and further bonded with cement 91E to the electrode 86B on the surface of the chamfer 84d of the member 89D.

In this hologram recording and reconstructing apparatus, the light-illuminating surface 90 is the (01$\bar{1}$) face and the voltage impressing direction is parallel with the <011> axis. This is a combination which can most improve the diffraction efficiency.

Figure 24:
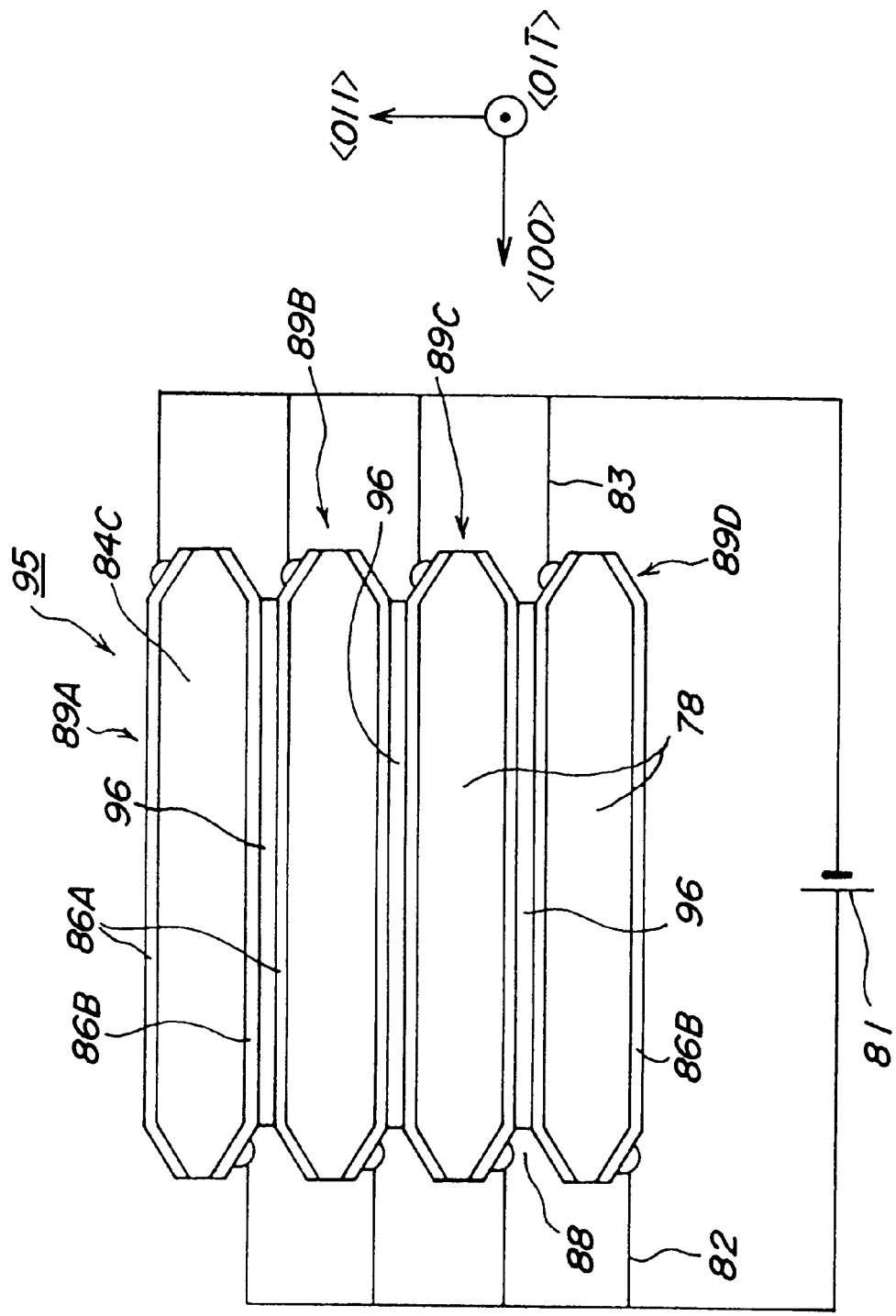
FIG. 24 a schematic view showing a hologram recording and reconstructing apparatus according to another embodiment of the present invention.

FIGS. 24 and 25 are schematic views, respectively, showing a hologram recording and reconstructing apparatus of another embodiment of the present invention. In the hologram recording and reconstructing apparatus shown in FIG. 24, the hologram element 95 consists of a conjoint body comprising 4 hologram members, 89A, 89B, 89C and 89D. Each hologram member comprises a narrow, long recording member 84C and electrodes 86A and 86B formed on both side surfaces, respectively, of this recording member 84C. Between the electrodes 86A and 86B of the adjacent hologram members, an insulator 96 is interposed.

Here, the insulator may be a plate-shaped insulating member which is separate from the other members. In this case, each electrode 86A or 86B can be joined with one insulator. Further, the insulator may be an insulating membrane formed on the electrode. In this case, since this electrode has already been joined with the insulating membrane, the insulating membrane and its opposite electrode are joined with each other.

In the embodiment shown in FIG. 24, a lead wire 83 extending from the negative pole of an electric source 81 is bonded to an electrode 86A of a member 89A, and another lead wire 82 extending from the positive pole of the electric source 81 is bonded to an electrode 86B of the member 89A. Similarly, the lead wire 83 extending from the negative pole of the electric source 81 is bonded to each electrode 86A of members 89B, 89C and 89D, and the lead wire 82 extending from the positive pole of the electric source 81 is bonded to each electrode 86B of the members 89B, 89C and 89D. The adjacent electrodes 86A and 86B are insulated from each other by an insulator 96.

As the polished light-illuminating surface 78 of each recording member 84C of every hologram member is substantially contiguous with others, a light-illuminating surface is formed, and this light-illuminating surface functions as a light-incident surface for object rays and reference rays.

In the element 100 of the embodiment shown in FIG. 25, common electrodes 97 and 98 are used. Namely, the electrode 97 or 98 is formed on the recording member 84C. On the principal surface of the end recording member 84C, the common electrode 97 or 98 is also formed and, at the same time, an electrode 99 or 101 is also formed on the endmost surface. In this instance, the recording member 84C is bonded to each of the electrodes 97 and 98. A lead wire 83 extending from the negative pole of the electric source 81 is bonded to the electrodes 97 and 99, and a lead wire 82 extending from the positive pole of the electric source 81 is bonded to the electrode 98. The electrodes 97 and 98 are used respectively for impressing voltage on mutually adjacent 2 recording members.

Another preferred embodiment for manufacturing the hologram elements according to the present invention will be explained with reference to FIG. 26. At the outset, according to the process shown in FIG. 2 or 11, wafer 84 as shown in FIG. 21a is cut out. By ground processing the side surface 84c sides of this wafer 84, the wafer 84A shown in FIGS. 21b and 21c is obtained. Then, membraneous electrodes are formed on a couple of principal surfaces 84a and chamfers 84d of this wafer 84A to provide assemblies 85A, 85B, 85C and 85D, as shown in FIGS. 26a and 26b. Here, on each principal surface 84a and chamfers 84d of the wafer 84A, membraneous electrodes 86A and 86B are formed, respectively.

Then, as shown in FIG. 26b, a predetermined number of the assemblies 85A, 85B, 85C and 85D are conjoined together. Needless to say, the number of these assemblies are changed appropriately according to dimensions or the like of the objective element. Then, this conjoint body is cut in a direction perpendicular to the principal surfaces of each member shown in FIG. 26b, and plural pieces of the element shown in FIGS. 23a and 23b are produced from the above conjoint body. In each element, the members 89A, 89B, 89C and 89D are joined with each others.

Thus, hologram elements can be manufactured by forming predetermined electrodes on wafer, stacking the wafer on the other one, conjoining the stacks of wafer together to produce a conjoint body and cutting this conjoint body. Thereby, since the particularly a complicated and troublesome bonding step can be completed at once by a batch process, this process is specially preferred from the manufacturing point of view as compared with the case where the cutting is first conducted.

By using hologram elements fabricated as mentioned above, hologram recording and reconstruction can be conducted according to the first embodiment of the present invention.

A hologram element 92 as shown in FIG. 23b was fabricated according to the aforementioned process explained with reference to FIGS. 21, 22 and 23, its diffraction efficiency was determined, and further an experiment of hologram recording and reconstruction was conducted.

Manufacture of a Hologram Element

At the outset, a $Bi_{12}SiO_{20}$ single crystalline body 51 having a diameter of 80 mm and a length of 100 mm was manufactured. As a crucible, a cylindrical platinum crucible having a diameter of 150 mm and a height of 150 mm was used. 14 kg of a $Bi_{12}SiO_{20}$ sintered body was received in the crucible and heated at 900° C. to produce molten liquid.

By using an after-heater made of platinum, the temperature gradient in the pull-up direction of the single crystalline body 51 was adjusted to be 50–75° C./cm up to 10 mm above and 10° C./cm up to following 150 mm above. Additionally, the pull-up rate was 1–1.5 mm/hour and the rotation rate of the pull-up shaft was 10 rpm. Characteristics of the obtained single crystal are shown in Table 4 below.

TABLE 4

| | |
|---|---|
| Lattice constant | $10.103 \times 10^{-10}$ m |
| Density | 9.2 g/cm$^3$ |
| Dielectric constant | 56 (100 kHz) |
| Refractive index | 2.53 ($\lambda$ = 633 nm) |
| Dark resistance | $10^{14} \Omega \cdot$ cm |
| Photoconductivity | $10^8 \Omega \cdot$ cm ($\lambda$ = 458 nm, 2.5 mW/cm$^2$) |
| Half-wave voltage | 3900 V ($\lambda$ = 633 nm) |
| Verdet's constant | $3.67 \times 10^{-3}$/Oe $\cdot$ cm ($\lambda$ = 633 nm) |
| | $9.33 \times 10^{-4}$/Oe $\cdot$ cm ($\lambda$ = 1150 nm) |

From this single crystalline body 51, wafer 84 as shown in FIG. 21a was cut out according to the process shown in Figs. 11a and 11b. The dimension of this wafer 84 was 50 mm×50 mm×3 mm. A couple of principal surfaces 84a of this wafer 84 were polished with a flat polishing machine to provide a flatness of 0.6 μm. The ridges 85 of this wafer 84 were ground-processed to form chamfers 84d 1 mm wide. Then, on both the principal surfaces 84a, transparent electrode membranes 86A and 86B 1,000 angstrom thick of indium tin oxide were formed, respectively, by means of vacuum deposition, and an assembly 85 was fabricated.

This assembly 85 was cut with a dicing saw and element materials 3.5 mm wide were produced. The number of these element materials was 14 pieces. These element materials were bonded to each others at the transparent electrode membrane side with a transparent optical cement and a conjoint body as shown in FIG. 23a was obtained. Then, the light-illuminating surfaces of the conjoint body were optically polished with a flat polishing machine to form polished surfaces 90. The polished amount was 0.25 mm each so as to thereby provide a thickness of 3.0 mm after finishing of each recording member 84C. As the cements 91A, 91B, 91C, 91D and 91E, a silver paste was used and an element 92 was finished.

Determination of Diffraction Efficiency

This element was fixed with a holder made of TEFLON and a voltage of 6 kV was impressed by an electric source 81 between the lead wires 82 and 83. At first, the diffraction efficiency was tested. At first, the diffraction efficiency was tested. Two argon ion laser lines intersecting at an intersectant angle of 3° were projected on the light-illuminating surface of the element. Each laser line had a wavelength of 488 nm and a diameter of 100 mm. Interference fringes with a ring pitch of 100 p/mm were formed on the element, and recorded therein. The projected laser lines had an energy of 4 mJ/Cm$^2$.

A helium-neon laser line of wavelength 633 nm was projected on the light-illuminating surface at an angle of incidence satisfying the Bragg's diffraction conditions with respect to the interference fringes thus recorded in the element and primary diffracted rays were obtained. Here, since the $Bi_{12}SiO_{20}$ single crystal hologram was a thick volume hologram, the selectivity of the angle of incidence of the reconstruction rays was so severe that the reconstruction rays might not be diffracted unless the rays were made incident in the direction satisfying the Bragg's conditions. As the result, the ratio of intensity of the primary diffracted rays to the incident rays (diffraction efficiency) was 22%. As the above, with this element, we succeeded in obtaining a sufficient diffraction efficiency as high as 22% at a relatively low voltage such as 6 kV, that would not necessitate particular strict countermeasures against electric discharges or the like.

Experiment for Hologram Recording and Reconstruction

With an optical system as schematically shown in FIG. 27, an experiment for hologram recording and reconstruction by using the above hologram recording and reconstructing apparatus was conducted. The above-described element 112 was arranged in a predetermined position. An argon ion laser line of wavelength 488 nm was emitted from a light source 113 and this laser line was divided in two by a half mirror 102. One of these divided laser lines passed through a lens 104 and a diffusion plate 105, which was then scattered by the diffusion plate 105 and transmitted by a transparent film 106 of a dimension of 50 mm×50 mm with an original picture printed thereon. The emergent beam from the film 106, as object rays, was projected on the element.

On the other hand, of the argon ion laser line, the line which had passed through the half mirror 102 was reflected by a mirror 103 and transmitted by a collective lens 108 and a collimating lens 107 and projected, as reference rays, on the light-illuminating surface. The object rays and reference rays were made to intersect each other at an intersectant angle of 3°. Thus, the original picture was able to be recorded in the element. The projected optical energy was 4 mJ/cm².

Then, a helium-neon laser line of wavelength 633 mm, having a diameter of 100 mm and a uniform actinometric distribution, was emitted from a light source 111, transmitted by a collective lens 109 and a collimating lens 110 and made incident on the light-illuminating surface of the element. The angle of incidence of this laser line was made to an angle of incidence satisfying the Bragg's diffraction conditions with respect to the interference fringes recorded in the element.

By observation of this reconstruction rays, it was found that the reconstructed image had been reconstructed at a position corresponding to the original image and that the depth of the original image also had been reproduced on the reconstructed holography. Besides, this depth of the holography was confirmable by utilizing binocular parallax. Thus, the present invention has succeeded in provision of a three-dimensional display by a real-time hologram which can reproduce and confirm precisely the depth with stereoscopic sense, utilizing binocular parallax Additionally, the image thus recorded in the element was able to be erased by illuminating the entire light-illuminating surface of the element with a uniform blue light under a condition such that the voltage impressed on the element is 0 V.

As described above, according to the present invention, even when an electric source of low voltage is used, hologram recording and reconstruction can be conducted by driving a relatively large-size hologram element consisting of a single crystal having a photoinducing refractive effect. Thereby, hologram elements and hologram recording and reconstructing apparatuses by which hologram images can be observed utilizing binocular parallax can be provided. Further, brightnesses of hologram reconstructed images can be enhanced than before.

In the above descriptions, though the present invention has been explained with respect to specific, preferred embodiments, the specified particulars are only exemplificative. It should be understood that the present invention can be performed in other ways without departing from the true spirit and scope of the appended claims.

What is claimed is:

1. A hologram recording and reconstructing apparatus having a volume hologram comprised of a material capable of exhibiting a photoinducing refractive effect, comprising:
   means for projecting object rays having a wavelength on said volume hologram;
   means for projecting reference rays on said volume hologram, and;
   means for illuminating said volume hologram with a diffused spherical wave as reconstruction rays having a wavelength longer than the wavelength of the object rays.

2. The hologram recording and reconstructing apparatus according to claim 1, further comprising means for detecting a point of observation of a reconstructed image and driving means for shifting a collective point of the reconstruction rays corresponding to a signal from said detecting means, and so constructed as to shift a focal point of said reconstruction rays by said driving means, whereby an angle of incidence φ (y) of said reconstruction rays on the volume hologram at a position distant by y from an intersectant point O on the volume hologram substantially satisfies the following formula (1):

$$\phi(y)=(\lambda_2/\lambda_1)\cdot(\theta+y/L)/2+(\theta-y/L)/2 \quad (1)$$

wherein θ is an intersectant angle made by the object rays and reference rays being projected on said volume hologram, $\lambda_1$ is a wavelength of the object rays and $\lambda_2$ is a wavelength of the reconstruction rays, L is a distance between the point of observation and said volume hologram, a y-axis is set up in a direction parallel with principal surfaces of said volume hologram, and at the intersectant point O, a perpendicular line extending from said point of observation to said y-axis intersects said y-axis.

3. The hologram recording and reconstructing apparatus according to claim 1, wherein said illuminating means comprises a light source for emitting reconstruction rays and a lens means for converting the reconstruction rays to a spherical wave, said lens means comprises a lens array comprising collective lenses arranged in a unidimensional or two-dimensional array.

4. A method of recording and reconstructing a hologram, comprising the steps of:
   a) providing a volume hologram comprising a material capable of exhibiting a photoinducing refractive effect for recording interference fringes in said volume hologram;
   b) projecting object rays and reference rays on said volume hologram, said object rays having a wavelength λ1; and
   c) reconstructing a hologram by illuminating said volume hologram with reconstruction rays having a wavelength λ2 longer than said wavelength λ1 and comprising a diffused spherical wave.

5. The hologram recording and reconstructing method according to claim 4, further comprising the step of positioning a focal point of the reconstruction rays and a point of observation so that an angle of incidence φ (y) of said reconstruction rays on the volume hologram at a position distant by y from an intersectant point O on said volume hologram may substantially satisfy the following formula (1):

$$\phi(y)=(\lambda_2/\lambda_1)\cdot(\theta+y/L)/2+(\theta-y/L)/2 \quad (1)$$

wherein θ is an intersectant angle made by the object rays and reference rays projected on said volume hologram, a y-axis is set up in a direction parallel with principal surfaces of said volume hologram, L is a distance between the point of observation and said y-axis, and at the intersectant point O, a perpendicular line extending from said point of observation to said y-axis intersects said y-axis.

6. The hologram recording and reconstructing method according to claim 4, wherein said volume hologram comprises a hologram element, the hologram element comprising:

a plurality of recording members;

each of said recording members comprising a single crystal capable of exhibiting photoinducing refractive effect;

each of said recording members comprising a light-illuminating surface and opposed side surfaces;

each of said opposed side surfaces being in contact with an electrode for impressing a voltage on the recording member therebetween, each electrode being located between adjacent recording members; and said recording members joined together to form an integral conjoint body such that the light-illuminating surfaces of said recording members together form a substantially planar surface, wherein each said recording member and the two adjacent electrodes function as a hologram member when a voltage is impressed on the recording member.

7. The hologram recording and reconstructing method according to claim 4, wherein said volume hologram comprises a hologram element, the hologram element comprising:

a plurality of plate-shaped recording members;

each of said recording members comprising a single crystal capable of exhibiting photoinducing refractive effect;

each of said recording members comprising a light-illuminating surface and opposed side surfaces;

each of said opposed side surfaces being in contact with an electrode for impressing a voltage on the respective recording member therebetween, each electrode being located between adjacent recording members;

said recording members and the electrodes being joined together to form a plate-shaped conjoint body having a substantially planar surface; and said planar surface comprising the light-illuminating surfaces of said recording members and the edges of said electrodes, wherein each said recording member and the adjacent two electrodes function as a hologram member when a voltage is impressed on the recording member.

8. A method of recording and reconstructing a hologram, comprising the steps of:

a) providing a volume hologram comprising a material capable of exhibiting a photoinducing refractive effect for recording interference fringes in said volume hologram;

b) projecting object rays and reference rays on said volume hologram, said object rays having a wavelength $\lambda 1$; and c) reconstructing a hologram by illuminating said volume hologram with reconstruction rays having a wavelength $\lambda 2$ shorter than said wavelength $\lambda 1$ and comprising a convergent spherical wave, wherein said volume hologram comprises a hologram element, the hologram element comprising:

a plurality of recording members;

each of said recording members comprising a single crystal capable of exhibiting photoinducing refractive effect;

each of said recording members comprising a light-illuminating surface and opposed side surfaces;

each of said opposed side surfaces being in contact with an electrode for impressing a voltage on the recording member therebetween, each electrode being located between adjacent recording members; and said recording members joined together to form an integral conjoint body such that the light-illuminating surfaces of said recording members together form a substantially planar surface, wherein each said recording member and the two adjacent electrodes function as a hologram member when a voltage is impressed on the recording member.

9. A method of recording and reconstructing a hologram, comprising the steps of:

a) providing a volume hologram comprising a material capable of exhibiting a photoinducing refractive effect for recording interference fringes in said volume hologram;

b) projecting object rays and reference rays on said volume hologram, said object rays having a wavelength $\lambda 1$; and c) reconstructing a hologram by illuminating said volume hologram with reconstruction rays having a wavelength $\lambda 2$ shorter than said wavelength $\lambda 1$ and comprising a convergent spherical wave, wherein said volume hologram comprises a hologram element, the hologram element comprising:

a plurality of plate-shaped recording members;

each of said recording members comprising a single crystal capable of exhibiting photoinducing refractive effect;

each of said recording members comprising a light-illuminating surface and opposed side surfaces;

each of said opposed side surfaces being in contact with an electrode for impressing a voltage on the recording member therebetween, each electrode being located between adjacent recording members;

said recording members and the electrodes being— joined together to form a plate-shaped cojoint body having a substantially planar surface; and said planar surface comprising the light-illuminating surfaces of said recording members and the edges of said electrodes, wherein each said recording member and the two adjacent electrodes fumction as a halogram when a voltage is impressed on the recording member.

\* \* \* \* \*